US011061465B2

(12) United States Patent
Kim

(10) Patent No.: US 11,061,465 B2
(45) Date of Patent: Jul. 13, 2021

(54) APPLICATION PROCESSOR INCLUDING LOW POWER VOICE TRIGGER SYSTEM WITH SECURITY, ELECTRONIC DEVICE INCLUDING THE SAME AND METHOD OF OPERATING THE SAME

(71) Applicant: Samsung Electronics Co., Ltd., Suwon-si (KR)

(72) Inventor: Sun-Kyu Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 110 days.

(21) Appl. No.: 16/176,026

(22) Filed: Oct. 31, 2018

(65) Prior Publication Data

US 2019/0227620 A1 Jul. 25, 2019

(30) Foreign Application Priority Data

Jan. 25, 2018 (KR) .................. 10-2018-0009410

(51) Int. Cl.
*G06F 1/32* (2019.01)
*G06F 1/3287* (2019.01)
(Continued)

(52) U.S. Cl.
CPC .......... *G06F 1/3287* (2013.01); *G06F 1/1626* (2013.01); *G06F 1/3253* (2013.01); *G06F 3/062* (2013.01); *G06F 3/0638* (2013.01); *G06F 3/0673* (2013.01); *G06F 21/74* (2013.01); *G06F 21/78* (2013.01); *G06N 20/00* (2019.01); *G10L 15/08* (2013.01); *G10L 15/22* (2013.01); *G10L 25/84* (2013.01); *G06F 2221/2149* (2013.01);
(Continued)

(58) Field of Classification Search
None
See application file for complete search history.

(56) References Cited

U.S. PATENT DOCUMENTS 9,602,938 B2 3/2017 Godlstein et al.
9,767,805 B2 9/2017 Dai et al.
(Continued)

FOREIGN PATENT DOCUMENTS

KR 10-2016-0108136 A 9/2016

OTHER PUBLICATIONS

Sykes, Mark; Beigi, Homayoon; Iranpour, Ali; Belnet, Lionel, "The New Voice of the Embedded Intelligent Assistant," Recognition Technologies and Arm white paper, Semiconductor Engineering, Jul. 16, 2018 (15 pages) (retrieved Oct. 31, 2018) (available at https://pages.arm.com/speech-recognition-whitepaper.html).

*Primary Examiner* — Fahmida Rahman
(74) *Attorney, Agent, or Firm* — Muir Patent Law, PLLC

(57) ABSTRACT

An application processor includes a system bus, a host processor and a voice trigger system that are electrically connected to the system bus. The voice trigger system performs a voice trigger operation and issue a trigger event based on a trigger input signal that is provided through a trigger interface. The voice trigger system is secured independently of the host processor. The voice trigger system performs the voice trigger operation based on secured user voice information that is stored in a security region in the secured voice trigger system during a sleep mode in which the system bus and the host processor are disabled.

20 Claims, 14 Drawing Sheets

(51) Int. Cl.
 *G06F 21/78* (2013.01)
 *G06F 21/74* (2013.01)
 *G06F 3/06* (2006.01)
 *G10L 15/22* (2006.01)
 *G10L 15/08* (2006.01)
 *G10L 25/84* (2013.01)
 *G06F 1/3234* (2019.01)
 *G06N 20/00* (2019.01)
 *G06F 1/16* (2006.01)
 *H04L 7/00* (2006.01)
 *G10L 25/48* (2013.01)

(52) U.S. Cl.
 CPC ........ *G10L 25/48* (2013.01); *G10L 2015/088* (2013.01); *G10L 2015/223* (2013.01); *H04L 7/00* (2013.01)

(56) References Cited

U.S. PATENT DOCUMENTS

| | | |
|---|---|---|
| 2007/0172049 A1 | 7/2007 | Sumasu |
| 2007/0296460 A1* | 12/2007 | Takigawa ............... G06F 1/3203 326/62 |
| 2010/0030928 A1* | 2/2010 | Conroy ................. G06F 13/124 710/23 |
| 2011/0154364 A1 | 6/2011 | Vaddagiri |
| 2014/0222436 A1 | 8/2014 | Binder et al. |
| 2015/0070184 A1* | 3/2015 | Dadu ..................... G08B 21/24 340/692 |
| 2016/0240194 A1* | 8/2016 | Lee ....................... G06F 1/3293 |
| 2016/0337857 A1 | 11/2016 | Carron et al. |
| 2016/0360372 A1 | 12/2016 | Chen et al. |
| 2018/0082085 A1 | 3/2018 | Yau et al. |
| 2019/0230458 A1* | 7/2019 | Rand ....................... G10L 15/08 |

* cited by examiner

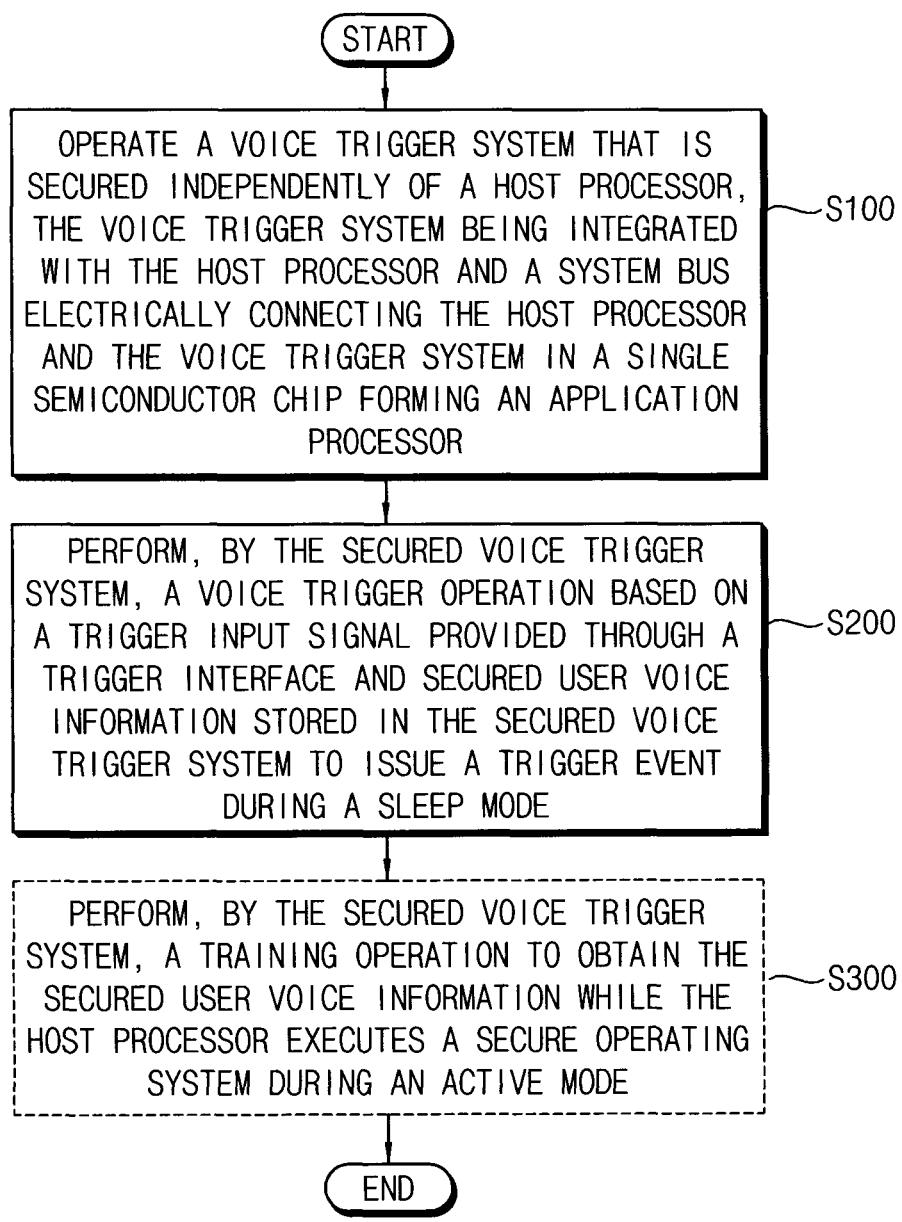

APPLICATION PROCESSOR INCLUDING LOW POWER VOICE TRIGGER SYSTEM WITH SECURITY, ELECTRONIC DEVICE INCLUDING THE SAME AND METHOD OF OPERATING THE SAME

CROSS-REFERENCE TO RELATED APPLICATION

This application claims the benefit of priority under 35 USC § 119 to Korean Patent Application No. 10-2018-0009410, filed on Jan. 25, 2018, in the Korean Intellectual Property Office (KIPO), the contents of which are herein incorporated by reference in its entirety.

BACKGROUND

1. Technical Field

Example embodiments relate generally to semiconductor integrated circuits, and more particularly to application processors including low power voice trigger systems with security, electronic devices including the application processors, and methods of operating the application processors.

2. Description of the Related Art

Recently, voice-based or sound-based intelligent interfaces have been introduced into the marketplace. One advantage of such voice-based intelligent interfaces is that users can interact with a device in a hands-free manner without handling or even looking at the device. Hands-free operation can be particularly beneficial when a person cannot or should not physically handle a device, such as when they are driving. However, to initiate the voice-based intelligent interface, users typically must press a button or select an icon on a touch screen. This tactile input detracts from the user experience of the voice-based intelligent interface.

Accordingly, the electronic devices have been developed to activate a voice-based intelligent interface using inputs of voice, speech, sound, sensing, etc., and not a tactile input. Such an electronic device requires continuous or intermittent monitoring of an audio channel to detect the voice input and issue a trigger event for initiating the voice-based intelligent interface. The operation for issuing the trigger event may be referred to as a voice trigger operation. This monitoring of the audio channel consumes electrical power, which is a limited resource on handheld or portable devices that rely on batteries. Thus, it is beneficial to provide an energy-efficient solution associated with the voice trigger operation.

SUMMARY

At least one example embodiment of the present disclosure provides an application processor that includes a voice trigger system capable of performing a voice trigger operation with low power and supporting security features.

At least one example embodiment of the present disclosure provides an electronic device including the application processor.

In some embodiments, the disclosure is directed to an application processor comprising: a system bus; a host processor electrically connected to the system bus; and a voice trigger system electrically connected to the system bus, the voice trigger system being configured to perform a voice trigger operation and issue a trigger event based on a trigger input signal that is provided through a trigger interface, wherein the voice trigger system is secured independently of the host processor, and wherein the voice trigger system is configured to perform the voice trigger operation based on secured user voice information that is stored in a security region in the secured voice trigger system during a sleep mode during which the system bus and the host processor are disabled.

In some embodiments, the disclosure is directed to an electronic device comprising: an application processor; and at least one audio input-output device, the application processor comprising: a system bus; a host processor electrically connected to the system bus; and a voice trigger system electrically connected to the system bus, the voice trigger system being configured to perform a voice trigger operation and to issue a trigger event based on a trigger input signal that is provided through a trigger interface, wherein the voice trigger system is secured independently of the host processor, and wherein the voice trigger system is configured to perform the voice trigger operation based on secured user voice information that is stored in a security region in the secured voice trigger system during a sleep mode in which the system bus and the host processor are disabled.

In some embodiments, the disclosure is directed to a method of operating an application processor, the method comprising: operating a voice trigger system that is secured independently of a host processor, the voice trigger system being integrated with the host processor and a system bus electrically connecting the host processor and the voice trigger system in a single semiconductor chip forming the application processor; and performing, by the secured voice trigger system, a voice trigger operation based on a trigger input signal and secured user voice information to issue a trigger event during a sleep mode in which the system bus and the host processor are disabled, the trigger input signal being provided through a trigger interface, the secured user voice information being stored in a security region in the secured voice trigger system.

The application processor, the electronic device including the application processor and the method of operating the application processor according to example embodiments may perform the voice trigger operation with low power and high efficiency by integrating the voice trigger system in the application processor. The on-chip voice trigger system may perform some operations instead of a host processor in the application processor to reduce the power consumption and enhance the performance of the electronic device.

In addition, the voice trigger operation and/or the training operation may be performed by the voice trigger system that is secured independently of the host processor. Accordingly, in comparison with a conventional voice trigger system disposed external to an application processor, the application processor including the voice trigger system according to example embodiments may support enhanced security feature and may have improved security performance.

BRIEF DESCRIPTION OF THE DRAWINGS

Illustrative, non-limiting example embodiments will be more clearly understood from the following detailed description taken in conjunction with the accompanying drawings.

FIG. 1 is a flow chart illustrating a method of operating an application processor according to example embodiments.

DETAILED DESCRIPTION

Figure 2A:
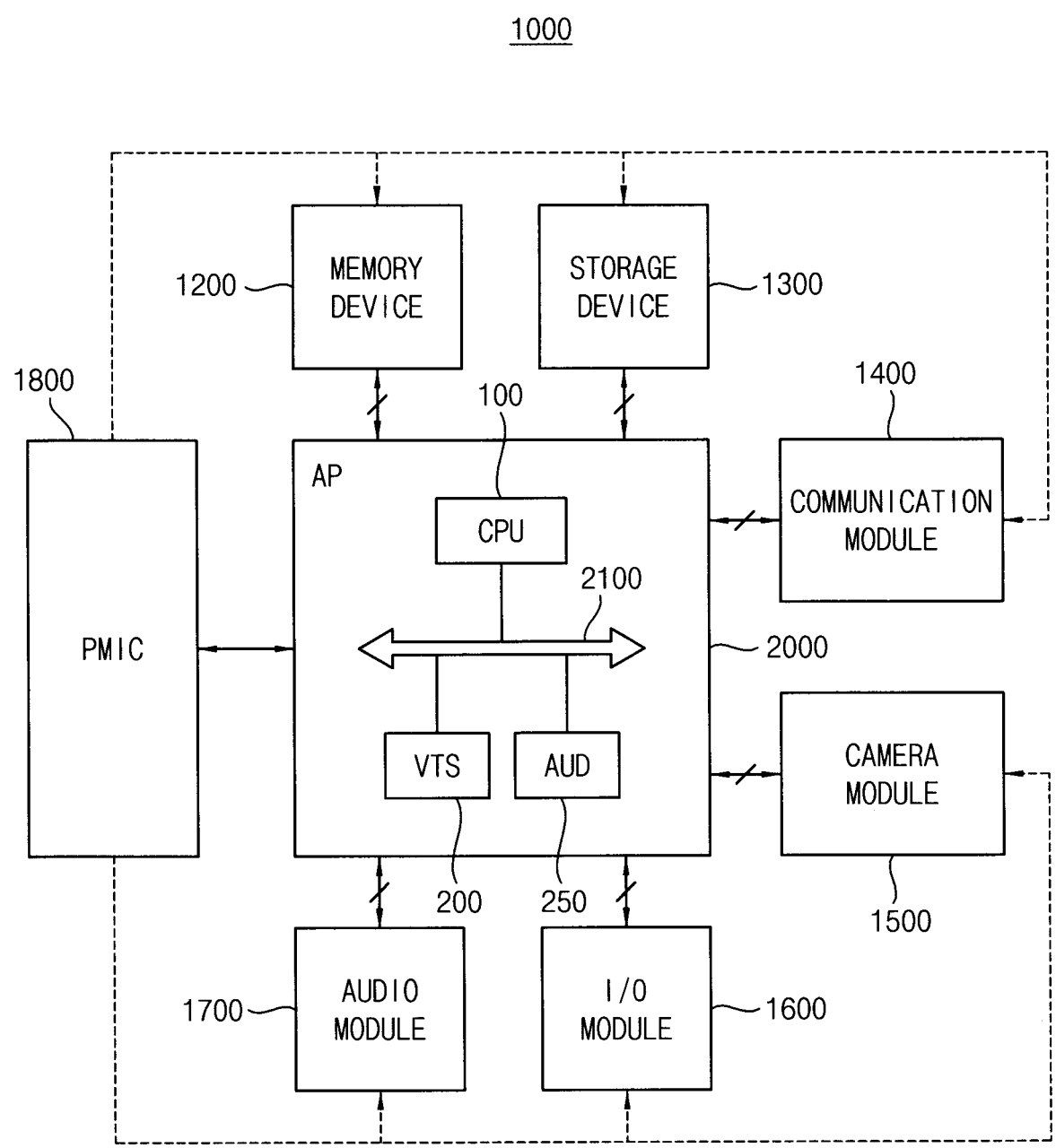
FIG. 2A is a block diagram illustrating an electronic device according to example embodiments.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a flow chart illustrating a method of operating an application processor according to example embodiments.

Referring to FIG. 1, in an application processor in which a host processor, a voice trigger system, and a system bus electrically connecting the host processor and the voice trigger system are integrated as a single semiconductor chip, the voice trigger system that is secured independently of the host processor operates or is driven (step S100). For example, the voice trigger system may be integrated with the host processor, and a system bus may electrically connect the host processor and the voice trigger system in a single semiconductor chip to form the application processor. As used herein, elements described as being "electrically connected" are configured such that communication signals can be passed from one element to the other, thereby allowing for communication between the elements. Elements described as being "secure" or "secured" are elements that have enhanced security protocols and/or technologies, as discussed more fully below.

During a sleep mode in which the system bus and the host processor are disabled, a voice trigger operation is performed by the secured voice trigger system based on a trigger input signal and secured user voice information (or secured trigger sound) to issue a trigger event (step S200). The trigger input signal is provided through a trigger interface, and the secured user voice information is stored in a security region in the secured voice trigger system. The security region may be a memory or storage region of the voice trigger system that uses security protocols to safeguard the information stored therein.

The voice trigger operation in this disclosure may indicate an operation to monitor whether the trigger input signal includes a particular trigger sound and issue a trigger event such as an interrupt signal to initiate a voice recognition mode or a voice-based intelligent interface when the trigger sound is detected. For example, the trigger input signal may be a pre-defined signal or action that, when detected by the voice trigger operation, causes the secured voice trigger system to issue a trigger event. The initiation of the voice recognition mode may include launching the host processor and/or the system bus into an active mode. For example, to reduce power consumption, the voice trigger operation may be performed during the sleep mode (e.g., while the system bus and the host processor are disabled and only the voice trigger system is enabled), and the system bus and the host processor may enter or wake up into the active mode when the trigger event is issued to initiate the voice recognition mode.

In some example embodiments, the trigger sound may include a word and a phrase of a human voice. In other example embodiments, the trigger sound may include sounds other than the human voice, such as a whistle, a sound of hand clapping, a siren, a sound of collision, a sound wave of a particular frequency range, amplitude, and/or duration, etc. The particular trigger sound may be pre-defined and stored in a memory of the secured voice trigger system. In this disclosure, the user voice information may correspond to the trigger sound described above.

While the host processor executes a secure operating system (OS) during the active mode in which the system bus and the host processor are enabled, a training operation may be performed by the secured voice trigger system to obtain the secured user voice information (step S300).

Although FIG. 1 illustrates an example where step S300 is performed after steps S100 and S200 are performed, the embodiments are not limited thereto. For example, step S300 may be performed first to obtain the secured user voice information, and then steps S100 and S200 may be performed later to issue the trigger event.

The application processor, the electronic device including the application processor, and the method of operating the application processor according to example embodiments may perform the voice trigger operation with low power and high efficiency by integrating the voice trigger system in the application processor. In addition, the voice trigger operation and/or the training operation may be performed by the voice trigger system that is secured independently of the host processor. The voice trigger system may include security policies and/or technologies that provide for the confidentiality and integrity of data and/or control access to the data to protect the data. In certain disclosed embodiments, the voice trigger system may be secured independently of the host processor such that the voice trigger system has security policies and/or technologies that are independent from the host processor, thereby providing an increased level of security for the voice trigger system. Accordingly, in comparison with a conventional voice trigger system disposed external to an application processor, the application processor including the voice trigger system according to example embodiments may support enhanced security feature and may have improved security performance.

FIG. 2A is a block diagram illustrating an electronic device according to example embodiments.

Referring to FIG. 2A, an electronic device 1000 includes an application processor AP 2000, a memory device 1200, a storage device 1300, a plurality of functional modules 1400, 1500, 1600 and 1700, and a power management integrated circuit PMIC 1800.

As is traditional in the field of the disclosed technology, features and embodiments are described, and illustrated in the drawings, in terms of functional blocks, units, and/or modules. Those skilled in the art will appreciate that these blocks, units, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or similar, they may be programmed using software (e.g., microcode) to perform various functions discussed herein and may optionally be driven by firmware and/or software. Alternatively, each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of the embodiments may be physically separated into two or more interacting and discrete blocks, units, and/or modules without departing from the scope of the inventive concepts. Further, the blocks, units and/or modules of the embodiments may be physically combined into more complex blocks, units, and/or modules without departing from the scope of the inventive concepts.

The application processor 2000 controls overall operations of the electronic device 1000. For example, the application processor 2000 may control the memory device 1200, the storage device 1300 and the plurality of functional modules 1400, 1500, 1600 and 1700. The application processor 2000 may be a system on chip (SoC).

The application processor 2000 may include a system bus 2100, a host processor or a central processing unit (CPU) 100, a voice trigger system VTS 200 and an audio processing system AUD 250, which are electrically connected to the system bus 2100.

The voice trigger system 200 may be electrically connected to the system bus 2100. The voice trigger system 200 may perform a voice trigger operation and issue a trigger event based on a trigger input signal that is provided through a trigger interface. The audio processing system 250 may include an audio subsystem and further include a sensor hub as will be described below. The audio subsystem may be electrically connected to the system bus 2100 to process audio streams that are replayed or recorded through an audio interface. In addition, the audio subsystem may further support the transfer of the audio streams between the audio interface and the memory device 1200. As used herein, the term "audio streams" may refer to a continuous transmission or receipt of audio data signals, such digital data transmitted and/or received by the audio processing system 250, designed to obtain or provide an uninterrupted audio (sound), such as uninterrupted music or voice output from a speaker or recorded by a microphone (as will be appreciated, the continuous transmission of audio data signals may be in the form of discrete packets of audio data transmitted or received discontinuously, such as via communications interspersed with unrelated data). Example embodiments of the voice trigger system 200 and the audio processing system 250 will be described below with reference to FIGS. 3 through 12B.

The memory device 1200 and the storage device 1300 may store data for operations of the electronic device 1000. The memory device 1200 may include a volatile memory device, such as a dynamic random access memory (DRAM), a static random access memory (SRAM), a mobile DRAM, etc. The storage device 1300 may include a nonvolatile memory device, such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc. In some example embodiments, the storage device 1300 may further include an embedded multimedia card (eMMC), a universal flash storage (UFS), a solid state drive (SSD), a hard disk drive (HDD), a CD-ROM, etc.

The functional modules 1400, 1500, 1600 and 1700 may be electronic circuits configured to perform various functions of the electronic device 1000. For example, the electronic device 1000 may include a communication module 1400 that performs a communication function (e.g., a code division multiple access (CDMA) module, a long term evolution (LTE) module, a radio frequency (RF) module, an ultra-wideband (UWB) module, a wireless local area network (WLAN) module, a worldwide interoperability for a microwave access (WIMAX) module, etc.), a camera module 1500 that performs a camera function (e.g., capturing and storing images), an input-output (I/O) module 1600 including a display module that performs a display function and a touch panel module that performs a touch sensing function, and an audio module 1700 including a microphone (MIC) module, a speaker module, etc. that performs input-output of audio signals. In some example embodiments, the electronic device 1000 may further include one or more additional modules, such as, for example, a global positioning system (GPS) module, a gyroscope module, etc. However, the functional modules 1400, 1500, 1600 and 1700 in the electronic device 1000 are not limited thereto.

The power management integrated circuit PMIC 1800 may provide an operating voltage to the application processor 2000, the memory device 1200, the storage device 1300, and the functional modules 1400, 1500, 1600 and 1700.

Figure 2B:
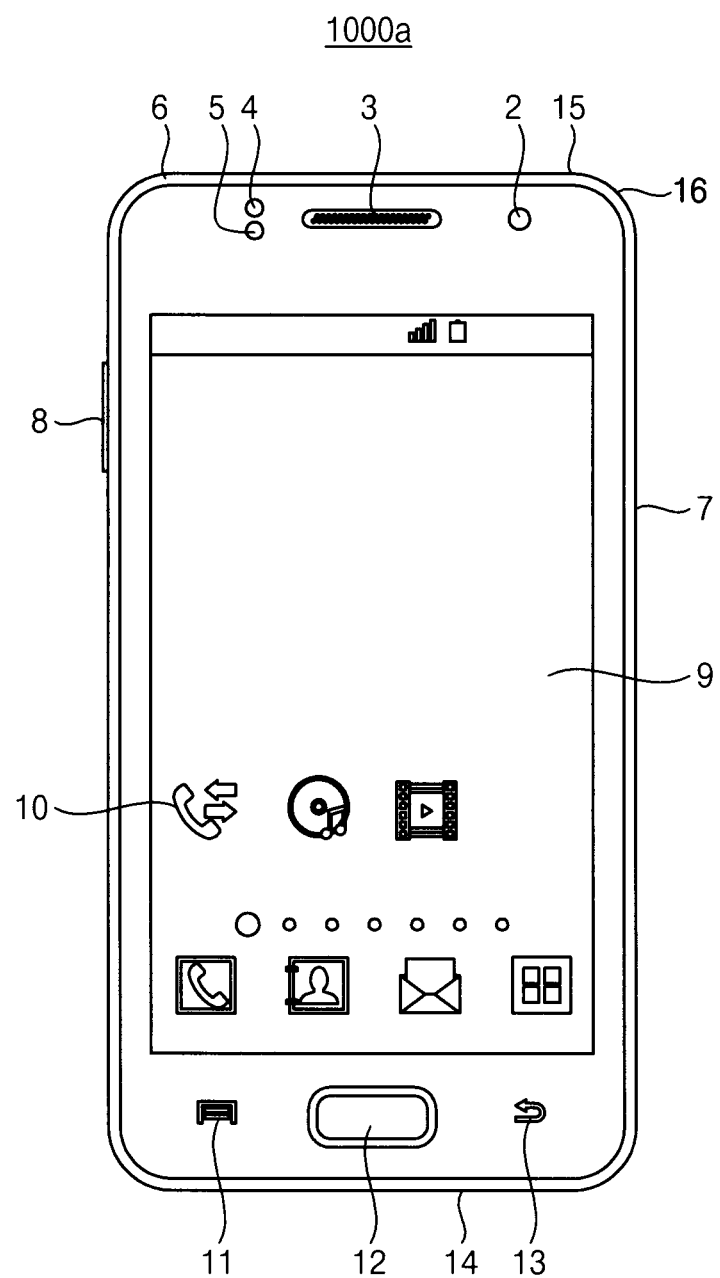
FIG. 2B is an example implementation of the electronic device of FIG. 2A.

FIG. 2B is an example implementation of the electronic device of FIG. 2A.

The electronic device 1000 of FIG. 2A may be a device, such as a desktop computer, a laptop computer, a cellular phone, a smart phone, an MP3 player, a personal digital assistant (PDA), a portable multimedia player (PMP), a digital television, a digital camera, a server computer, a workstation, a set-top box, a portable game console, a navigation system, a wearable device, an internet of things (IoT) device, an internet of everything (IoE) device, an e-book, a virtual reality (VR) device, an augmented reality (AR) device, etc. The electronic device 1000 may typically be operated in response to direct user input, but may also be used to communicate with other devices via the Internet or other network communication systems. FIG. 2B illustrates a cellular phone or a smart phone including a touch screen as an example of the electronic device 1000 of FIG. 2A.

Referring to FIG. 2B, an electronic device 1000*a* includes a front camera 2, a speaker 3, a proximity sensor 4, a luminance sensor 5, a universal serial bus (USB) interface 6, a power button 7, a volume button 8, a display and touch screen 9, icons 10, a menu button 11, a home button 12, a back button 13, a microphone 14, an audio output interface 15, and an antenna 16.

The front camera 2 may face in a same direction as the display and touch screen 9, and is used for a video call or video or photo shooting. The speaker 3 may output audio sound when, for example, a user plays multimedia data by touching the display and touch screen 9 on one of the icons 10 or inputting a signal by speech, talks with another user over a public switched telephone network, plays an operation sound of the electronic device 1000a, or otherwise initiates a notification sound. The proximity sensor 4 may control on or off of the display and touch screen 9 in order to save power and prevent mis-operation when a user holds the electronic device 1000a up to an ear for a telephone conversation. The luminance sensor 5 may control the operations of the display and touch screen 9 and the front camera 2 according to the quantity of incident light from the surroundings of the electronic device 1000a. The USB interface 6 may be an input/output interface for data communication with external devices and power supply.

The power button 7 may turn on or off the power of the electronic device 1000a or may turn on or off the display and touch screen 9. The volume button 8 may control the audio output of the speaker 3. The icons 10 corresponding to different functions may be displayed on the display and touch screen 9. For example, a user may select an icon 10 corresponding to playback of multimedia data by, for example, touching the icon 10.

The menu button 11 may allow a user to browse a menu including icons and settings. The home button 12 may allow a home screen to appear for multi-working mode even while the electronic device 1 is performing a certain operation on the display and touch screen 9. The back button 13 may cancel an operation which is currently being performed by the electronic device 1000a and return a user to a previous screen.

The microphone 14 may be an input-output (I/O) interface for voice calls or voice input signals. The audio output interface 15, e.g., an earphone jack, may be for audio output of multimedia data which is being played. Although not shown, audio output and microphone input may be interfaced through a device supporting Bluetooth. The antenna 16 may be used to transmit and receive communication signals and data. For example, the antenna 16 may be used to receive digital media broadcasting service. The elements of the electronic device 1000a may be embodied in various ways realizable to those of ordinary skill in the art. Some of the elements in FIG. 2B may be omitted or replaced with other elements.

Figure 3:
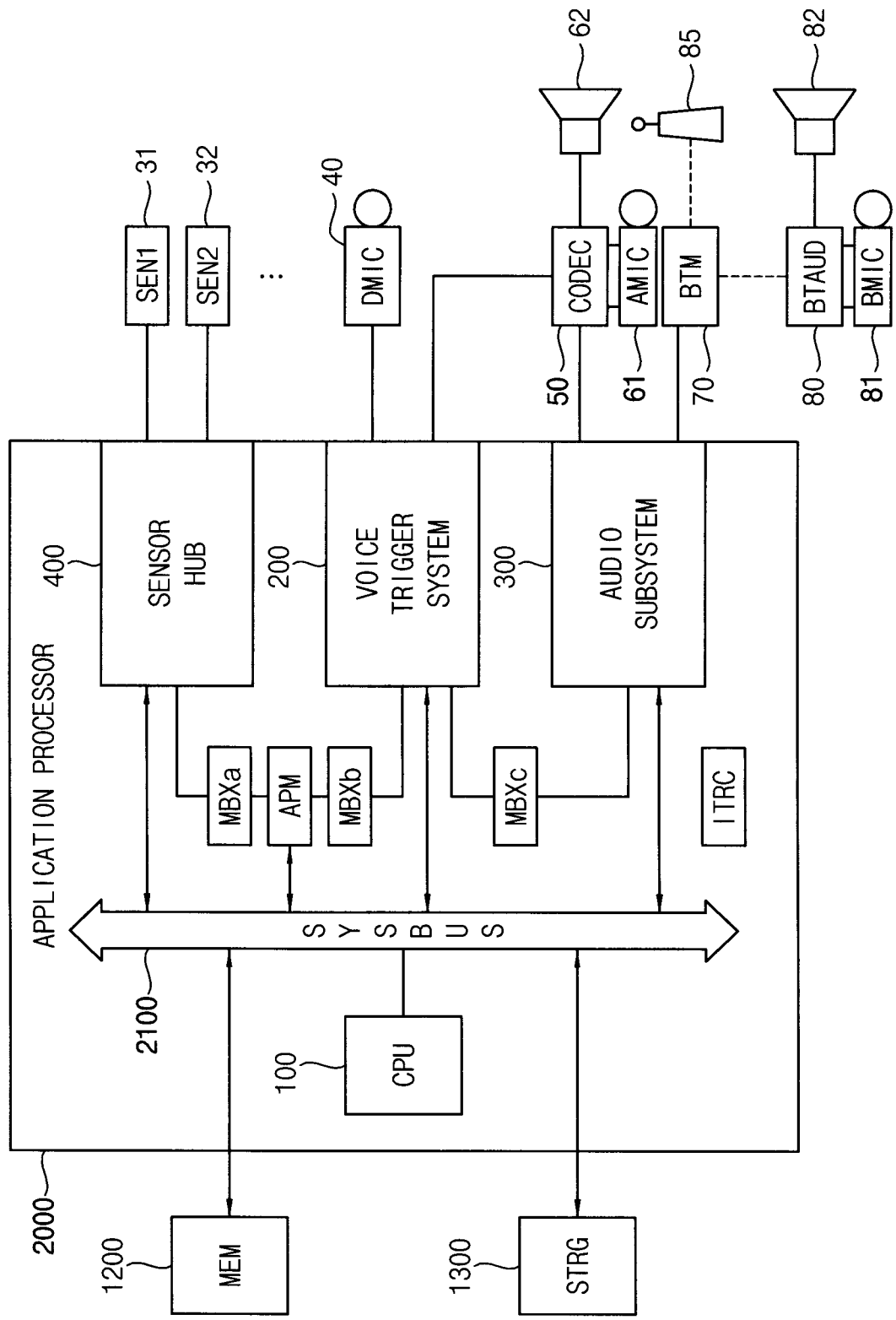
FIG. 3 is a block diagram illustrating an application processor according to example embodiments.

FIG. 3 is a block diagram illustrating an application processor according to example embodiments.

Referring to FIG. 3, an application processor 2000 may include a system bus SYSBUS 2100, a host processor or CPU 100, a voice trigger system 200, an audio subsystem 300, and a sensor hub 400. The audio subsystem 300 and the sensor hub 400 may be included in the audio processing system 250 in FIG. 2A. According to example embodiments, the application processor 2000 may further include an active power manager APM, mail box modules MBXa, MBXb and MBXc, and an interrupt controller ITRC.

The system bus 2100 may be referred to as an interconnect device or a backbone. The system bus 2100 may include a higher-layer bus, a lower-layer bus, and a bridge connecting the higher-layer and lower-layer buses. For example, the system bus 2100 may include various buses such as an advanced extensible interface (AXI), an advanced high-performance bus (AHB), an advanced peripheral bus (APB), etc., and at least one bridge connecting the various buses. The host processor 100 may access external devices such as a memory device 1200 and/or a storage device 1300 through the system bus 2100. In addition, the host processor 100 may communicate with the voice trigger system 200, the audio subsystem 300, and the sensor hub 400 through the system bus 2100.

Although one interrupt controller ITRC is illustrated in FIG. 3 for convenience of illustration, the interrupt controller ITRC may include at least one general interrupt controller (GIC), at least one vectored interrupt controller (VIC), etc. For example, the interrupt controller ITRC may be implemented as a programmable interrupt controller (PIC). The programmable interrupt controller may be implemented with multiple layers having a priority system represented by vectors. The programmable interrupt controller may receive interrupt signals from peripheral devices, determine priorities of the received interrupt signals, and issue an interrupt signals with pointer addresses to a processor or a controller.

The active power manager APM may manage powers of the application processor 2000. For example, the active power manager APM may manage individual powers supplied to respective regions or function blocks of the application processor 2000. The mail box modules MBXa, MBXb and MBXc may support a synchronization of data communication between the elements in the application processor 2000 or data communication between the application processor 2000 and external devices. The mail box modules MBXa, MBXb and MBXc will be described below with reference to FIG. 6.

Although FIG. 3 illustrates an example where the voice trigger system 200 and the audio subsystem 300 are connected to each other through one mail box module MBXc, and the voice trigger system 200 and the sensor hub 400 are connected to each other through one active power manager APM and two mail box modules MBXa and MBXb, the disclosure is not limited thereto. For example, the voice trigger system 200 and the audio subsystem 300 may be connected to each other through one active power manager and two mail box modules, and/or the voice trigger system 200 and the sensor hub 400 may be connected to each other through one mail box module.

The voice trigger system 200 is electrically connected to the system bus 2100. The voice trigger system 200 performs a voice trigger operation and issues a trigger event based on a trigger input signal that is provided through a trigger interface. In some example embodiments, the voice trigger system 200 may receive the trigger input signal from a digital microphone DMIC 40 and/or an audio codec (coder and decoder) CODEC 50. For example, the trigger interface of the voice trigger system 200 may be connected directly to the digital microphone 40 and the audio codec 50, thereby allowing for communication between the voice trigger system 200 and the digital microphone 40 and for communication between the voice trigger system 200 and the audio codec 50. The audio codec 50 may perform encoding and decoding (e.g., analog-to-digital conversion (ADC) and digital-to-analog conversion (DAC)) of an audio signal received from the digital microphone 40 or an analog microphone AMIC 61 and an audio signal output to a speaker 62. The digital microphone 40 may be an on-board microphone that is mounted with the application processor 2000 on a circuit board of the electronic device (e.g., electronic device 1000). The analog microphone 61 and the speaker 62 may be devices attachable to and detachable from terminals of the audio codec 50.

The audio subsystem 300 is electrically connected to the system bus 2100. The audio subsystem 300 processes audio streams that are replayed or recorded through an audio interface and supports transfer of the audio streams between the memory device 1200 and the audio interface. In some example embodiments, the audio subsystem 300 may exchange (e.g., transmit and receive) the audio streams with the audio codec 50 and/or a Bluetooth module BTM 70. For example, the audio interface of the audio subsystem 300 may be connected directly to the audio codec 50 and the Bluetooth module 70 through a wired or wireless communication medium (e.g., bus, line, cable, RF communications system, etc.). The Bluetooth module 70 may be connected to a Bluetooth microphone BMIC 81 and a Bluetooth speaker 82 through a Bluetooth audio module BTAUD 80 to receive the audio signals from the Bluetooth microphone 81 and output the audio signals to the Bluetooth speaker 82. The Bluetooth module 70 may be connected directly to another Bluetooth speaker 85 or another Bluetooth device through a wired or wireless communication medium (e.g., bus, line, cable, RF communications system, etc.). Although not illustrated in FIG. 3, the audio subsystem 300 may be connected to a universal serial bus (USB) module to exchange the audio stream with the USB module.

The sensor hub 400 is electrically connected to the system bus 2100. The sensor hub 400 processes signals provided from one or more sensors SEN1 31 and SEN2 32. The sensor hub 400 may measure physical qualities associated with the electronic device 1000 and process the measured physical qualities to determine operation status of the electronic device 1000 and process the determined operation status. For example, the sensors 31 and 32 may include a motion sensor, a gyro sensor, an atmospheric pressure sensor, a magnetic sensor, an accelerometer, a grip sensor, a proximity sensor, a biometric sensor, a temperature/humidity sensor, an illumination sensor, and an ultra violet (UV) sensor, an electrical-nose (E-nose) sensor, an electromyography (EMG) sensor, an electroencephalogram (EEG) sensor, an electrocardiogram (ECG) sensor, an infrared (IR) sensor, an iris sensor, and/or a finger print sensor.

In some example embodiments, as illustrated in FIG. 3, all of the system bus 2100, the voice trigger system 200, the audio subsystem 300 and the sensor hub 400 may be integrated in a single semiconductor chip forming the application processor 2000. In other example embodiments, the system bus 2100, the voice trigger system 200 and the audio subsystem 300 may be integrated in a single chip and the sensor hub 400 may be disposed external to the application processor 2000 (e.g., provided as or with another semiconductor chip). As such, the application processor 2000, the electronic device 1000 including the application processor 2000, and the method of operating the application processor 2000, according to example embodiments, may perform the voice trigger operation with low power and high efficiency by integrating the voice trigger system in the application processor 2000.

Figure 4:
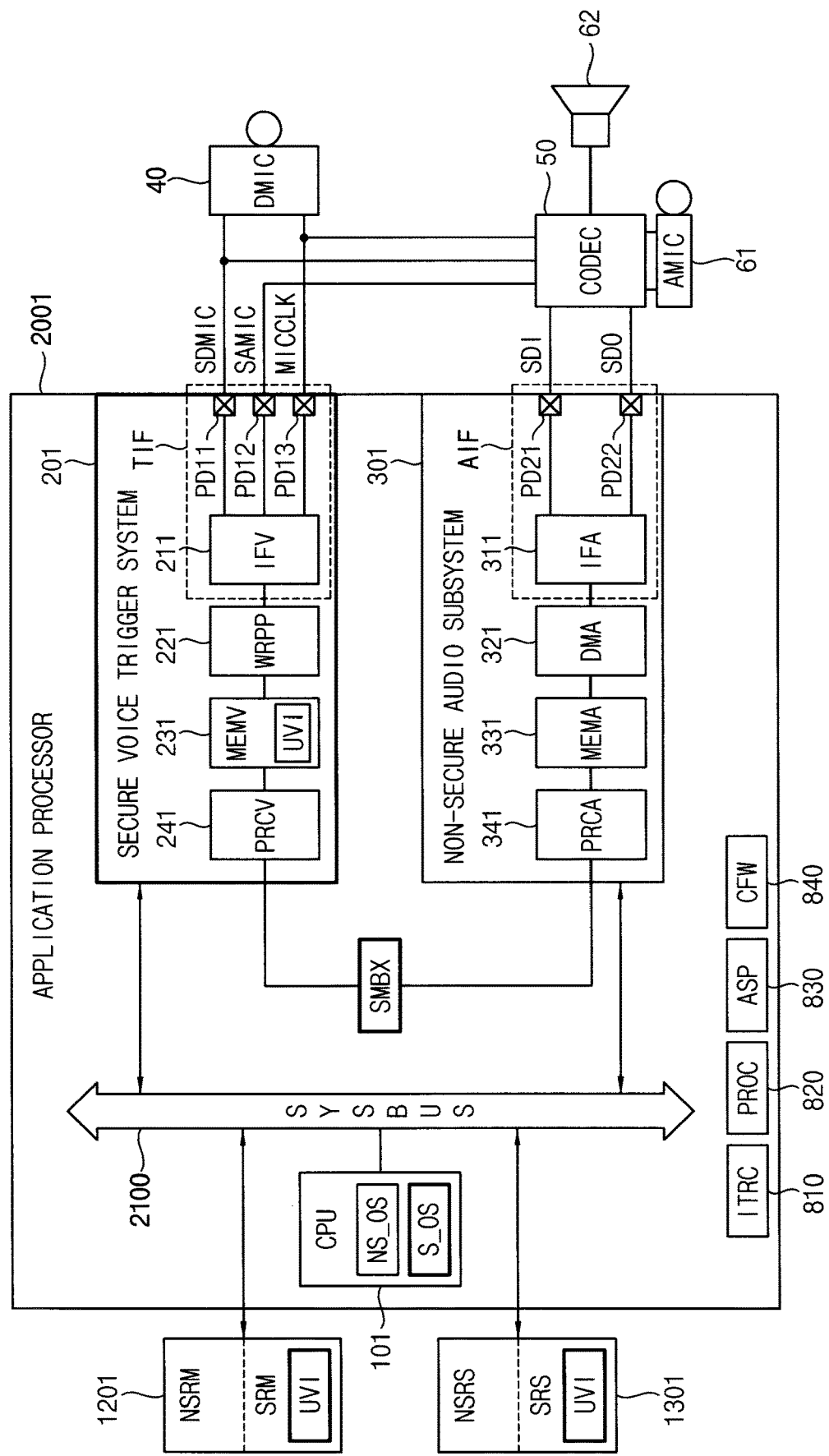
FIG. 4 is a block diagram illustrating an example connection of a voice trigger system and an audio subsystem in an application processor according to example embodiments.

FIG. 4 is a block diagram illustrating an example connection of a voice trigger system and an audio subsystem in an application processor according to example embodiments. The sensor hub 400 and other elements of FIG. 3 are omitted in FIG. 4 for convenience of illustration and the descriptions repeated with FIG. 3 may be omitted.

Referring to FIG. 4, an application processor 2001 may include a system bus SYSBUS 2100, a host processor or CPU 101, a voice trigger system 201, an audio subsystem 301, and a mail box module SMBX. The audio subsystem 301 may be included in the audio processing system 250 in FIG. 2A. The application processor 2001 may further include an interrupt controller ITRC 810, a protection controller PROC 820, an address space protector ASP 830, and a contents firewall CFW 840. Each of the interrupt controller 810, the protection controller 820, the address space protector 830, and the contents firewall 840 may be implemented by electronic (or optical) circuits such as logic circuits, discrete components, microprocessors, hard-wired circuits, memory elements, wiring connections, and the like. If implemented by microprocessors or similar, they may be programmed using software (e.g., microcode) to perform various functions discussed herein. The software may be stored as one or more instructions or code on computer-readable medium (e.g., RAM, ROM, storage media, etc.), such as the computer-readable medium described herein. The system bus 2100 and the host processor 101 are enabled during an active mode. For example, in the active mode, the system bus 2100 and the host processor 101 may be activated and available for use or operation. The host processor 101 may execute one of a secure operating system (OS) S_OS and a non-secure operating system (or a normal operating system) NS_OS during the active mode. The application processor 2001 may operate in a secure mode based on the secure operating system S_OS or in a non-secure mode (or a normal mode) based on the non-secure operating system NS_OS.

The system bus 2100 and the host processor 101 are disabled during a sleep mode. For example, in the sleep mode, the system bus 2100 and the host processor 101 may be in a low power mode with operations paused. In other words, the system bus 2100 and the host processor 101 may not operate during the sleep mode, and thus both the secure operating system S_OS and the non-secure operating system NS_OS may not be executed during the sleep mode.

The voice trigger system 201 is electrically connected to the system bus 2100. The voice trigger system 201 performs a voice trigger operation based on trigger input signals SDMIC and SAMIC that are provided to the voice trigger system 201 through a trigger interface TIF. The voice trigger system 201 may receive the trigger input signal SDMIC from a digital microphone DMIC 40 and/or the trigger input signal SAMIC from an audio codec (coder and decoder) CODEC 50. A microphone clock signal MICCLK may be transferred between the voice trigger system 201, the digital microphone 40, and the audio codec 50 for a synchronization of a signal transfer. The trigger input signals SDMIC and SAMIC and the microphone clock signal MICCLK may be transferred through pads PD11, PD12, and PD13. The pads PD11, PD12, and PD13 may be implemented such that the used pad may be prevented from being interfered with the other unused pads. For example, the pads PD11, PD12, and PD13 may be electrically isolated from one another, thereby preventing signal interference between the pads PD11, PD12, and PD13.

The voice trigger system 201 according to example embodiments is secured independently of the host processor 101. For example, the voice security system 201 may have security protocols that are independent and/or distinct from the security protocols of the host processor 101 or that may be operated independently and/or distinctly from the security protocols of the host processor 101. The secured voice trigger system 201 may mean that the voice trigger system 201 has a function of tamper-resistance against tampering attacks, such as micro-probing, a software attack, eavesdropping, a fault injection attack, etc., and the function of tamper-resistance may be implemented with various configurations and/or algorithms. In addition, the voice trigger system 201 secured independently of the host processor 101 may mean that the voice trigger system 201 independently or autonomously operates in the secure mode without the support of the host processor 101 even during the sleep mode in which the system bus 2100 and the host processor 101 are disabled.

In some example embodiments, the voice trigger system 201 may be included in a secure element that is integrated in the application processor 2001 such that the voice trigger system 201 is secured independently of the host processor 101. For example, the voice trigger system 201 may be independently secured based on a hardware configuration, e.g., using the secure element implemented with hardware. The secure element may be a secured system, module, device, region and/or data, or a system, module, device, region and/or data that operate in the secure mode. In addition, software associated with the voice trigger system 201, such as a framework, a hardware abstraction layer (HAL), a kernel driver, etc., may be stored in a secure memory region and/or a secure storage region and executed on the secure operating system S_OS, and thus all of signals and data input to the voice trigger system 201 may be secured and protected.

In the example block diagram of FIG. 4, each element illustrated by a bold solid line may represent a secured system, module, device, region and/or data, or a system, module, device, region and/or data in the secure mode. For example, in FIG. 4, the secured elements or elements operating in the secure mode include, e.g., the user voice information UVI of the memory device 1201, the user voice information UVI of the storage device 1301, the secure operating system S_OS of the host processor 101, the mail box module SMBX, and the secured voice trigger system 201.

The voice trigger system 201 may include a trigger interface circuit IFV 211, a wrapper WRPP 221, a trigger memory MEMV 231 and a trigger processor PRCV 241. Since the voice trigger system 201 is secured, the voice trigger system 201 may be referred to as a secure voice trigger system or a secured voice trigger system, and thus the trigger interface circuit 211, the wrapper 221, the trigger memory 231 and the trigger processor 241 may be referred to as a secure trigger interface circuit, a secure wrapper, a secure trigger memory and a secure trigger processor, respectively.

The trigger interface circuit 211 and the pads PD11, PD12, and PD13 may form the trigger interface TIF to sample and convert the trigger input signals SDMIC and SAMIC provided from the digital microphone 40 or the audio codec 50. The wrapper 221 may store data provided from trigger interface circuit 211 in the trigger memory 231. The wrapper 221 may issue an interrupt signal to the trigger processor 241 when a predetermined amount of data are stored in the trigger memory 231 so that the trigger processor 241 may perform the voice trigger operation based on data stored in the trigger memory 231.

In some example embodiments, the voice trigger system 201 may receive a pulse density modulation (PDM) signal as the trigger input signals SDMIC and SAMIC. The trigger interface circuit 211 may convert the PDM signal to a pulse code modulation (PCM) data. The wrapper 221 may store the PCM data in the trigger memory 231. The wrapper 221 may be implemented with a direct memory access controller.

In some example embodiments, the trigger memory 231 may store secured user voice information UVI. The voice trigger system 201 may perform the voice trigger operation based on the secured user voice information UVI that is stored in the trigger memory 231 corresponding to a security region in the secured voice trigger system 201 during the sleep mode. For example, when it is determined that the trigger input signals SDMIC and SAMIC include the secured user voice information UVI, the voice trigger system 201 may issue the trigger event to initiate the voice recognition mode.

In some example embodiments, while the host processor 101 executes the secure operating system S_OS during the active mode, a training operation may be performed by the secured voice trigger system 201 to obtain the secured user voice information UVI, as will be described with reference to FIG. 5.

The audio subsystem 301 is electrically connected to the system bus 2100. The audio subsystem 301 processes audio streams that are replayed or recorded through an audio interface AIF, and supports transfer of the audio streams between the memory device 1200 and the audio interface. In some example embodiments, the audio subsystem 301 may exchange (e.g., transmit and receive) the audio streams with the audio codec 50. The audio subsystem 301 may receive an audio input signal SDI through an audio input pad PD21 from the audio codec 50 and transmit an audio output signal SDO through an audio output pad PD22 to the audio codec 50.

Unlike the voice trigger system 201, the audio subsystem 301 may operate in a non-secure state or a normal state.

The audio subsystem 301 may include an audio interface circuit IFA 311, a direct memory access controller DMA 321, an audio memory MEMA 331 and an audio processor PRCA 341.

The audio interface circuit 311 and the pads PD21 and PD22 may form the audio interface AIF to transfer the audio streams through the audio input signal SDI and the audio output signal SDO. The audio memory 331 may store data of the audio streams, and the direct memory access controller 321 may control access to the audio memory, that is, data read from the audio memory 331 and data write to the audio memory 331. The audio processor 341 may process data stored in the audio memory 331.

In some example embodiments, the audio interface circuit 311 may be compatible with I2S (Inter-IC Sound) or IIS (Integrated Interchip Sound) standards. Although not illustrated in FIG. 4, the audio interface circuit 311 may operate based on clock signals according to the I2S standard. In some example embodiments, the audio interface circuit 311 may be connected directly to the digital microphone 40 and/or the audio codec 50.

The interrupt controller 810 may be responsible for setting secure properties of all interrupt resources in the application processor 2001. For example, the interrupt controller 810 may divide interrupts into secure interrupts and non-secure interrupts. The secure interrupts may be referred to as trusted interrupts or fast interrupt requests (FIQ). The non-secure interrupts may be referred to as normal interrupts, non-trusted interrupts or interrupt requests (IRQ). The secure interrupts may be processed while in the secure mode, and the non-secure interrupts may be processed while in the non-secure mode. Such secure properties of the interrupt resources might only be settable while in the secure mode. For example, settings of the secure properties of an interrupt resource may only be changed when the interrupt resource is in the secure mode.

The protection controller 820 may set secure properties of all of hardware resources (e.g., all elements) in the application processor 2001. For example, the protection controller 820 may divide hardware resources (e.g., elements) into first hardware resources for the secure mode and second hardware resources for the non-secure mode. The first hardware resources may operate exclusively in the secure mode, and the second hardware resources may operate exclusively in the non-secure mode. In some example embodiments, a single hardware resource may be included among both the first and second hardware resources. For example, a single hardware resource may operate in both the secure and non-secure modes. Such secure properties of the hardware resources might only be set in the secure mode and might not be set in the non-secure mode. For example, settings of the secure properties of a hardware resource may only be changed when the hardware resource is in the secure mode.

The address space protector 830 may divide a memory region in a memory device 1201 into a secure memory region SRM and a non-secure memory region NSRM, and may control access to the memory device 1201. In addition, the address space protector 830 may divide a storage region in a storage device 1301 into a secure storage region SRS and a non-secure storage region NSRS, and may control access to the storage device 1301. Such division of the memory regions and/or the storage regions might only be set in the secure mode. For example, the address space protector 803 may divide the memory regions and/or the storage regions of the memory device 1201 or the storage device 1301 when the respective memory device 1201 or storage device 1301 is in the secure mode. In some example embodiments, the address space protector 830 may be implemented as a memory adapter.

The contents firewall 840 may control accesses to the hardware resources in the application processor 2001 and may prevent leakage of information while in the secure mode.

In some example embodiments, the secured user voice information UVI may be further stored in the secure memory region SRM of the memory device 1201 and/or the secure storage region SRS of the storage device 1301, and thus the secured user voice information UVI may be stored safely and securely even when the application processor 2001 is disconnected from power.

Figure 5:
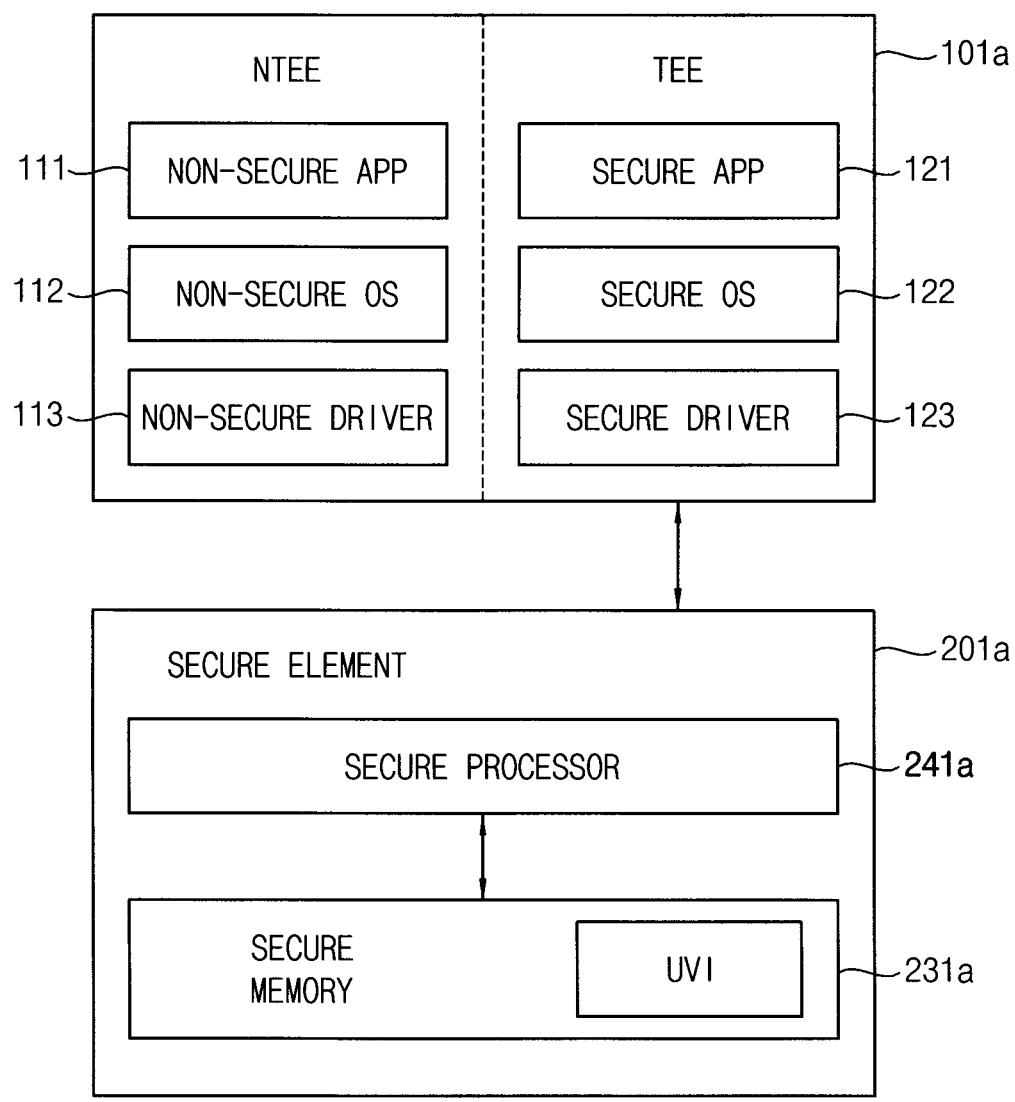
FIG. 5 is a block diagram illustrating an example connection of a voice trigger system and a host processor in the application processor of FIG. 4.

FIG. 5 is a block diagram illustrating an example connection of a voice trigger system and a host processor in the application processor of FIG. 4.

Referring to FIG. 5, a host processor 101a may operate in either the secure mode or the non-secure mode. For example, the secure mode may also be referred to as a trusted execution environment TEE, and the normal mode may also be referred to as a non-trusted execution environment NTEE. For example, the trusted execution environment TEE may be implemented based on TrustZone technology established by ARM, and then the protection controller 820 in FIG. 4 may be implemented as a TrustZone protection controller (TZPC). The non-trusted execution environment NTEE may be referred to as a normal execution environment or a rich execution environment.

In the non-trusted execution environment NTEE, a non-secure application 111 may be executed on a non-secure operating system 112, such as Android, etc., and a non-secure driver 113 (e.g., a device driver or a kernel driver) may be executed. In the trusted execution environment TEE, a secure application 121 may be executed on a secure operating system 122, such as Android, etc., and a secure driver 123 (e.g., a device driver or a kernel driver) may be executed.

A voice trigger system 201a may be implemented as a secure element including a secure memory 231a and a secure processor 241a. In other words, the secured voice trigger system 201a may be included in the secure element. The secure memory 231a and the secure processor 241a may correspond to the trigger memory 231 and the trigger processor 241 in FIG. 4, respectively. Although not illustrated in FIG. 5, the voice trigger system 201a may further include elements corresponding to the trigger interface circuit 211 and the wrapper 221 in FIG. 4.

In some example embodiments, the voice trigger system 201a may communicate with the host processor 101a in the trusted execution environment TEE. For example, while the host processor 101a executes the secure operating system 122 during the active mode, the training operation may be performed by the secured voice trigger system 201a to obtain the secured user voice information UVI, and the secured user voice information UVI obtained by the training operation may be stored in the secure memory 231a (e.g., the trigger memory 231 in FIG. 4) corresponding to a security region in the secured voice trigger system 201a.

For example, the training operation may be performed to capture and store user voice characteristics. The characteristics of the user voice may include user voice condition and voice environment. The user voice condition may include vocal spectral energy of the user voice, and a frequency bandwidth or frequency distribution of the user voice. The voice environment may include a reverberation time (RT) while issuing the voice command, and a signal-to-noise ratio (SNR) of the user voice. In other words, at least one of the energy of the user voice, the frequency bandwidth of the user voice, the reverberation time while the user voice is being input, and the signal-to-noise ratio of the user voice may be stored as characteristics of the user voice by the training operation.

The training operation may be performed while the host processor 101a executes the secure operating system 122 during the active mode, the secured voice trigger system 201a may be used as an input path, and thus the secured user voice information UVI and the trigger input signal may be safely and securely obtained and protected.

In addition, the voice trigger system 201a may be secured independently of the host processor 101a, and thus the secured voice trigger system 201a may safely and securely perform the voice trigger operation based on the secured user voice information UVI during the sleep mode in which the host processor 101a is disabled. For example, once the secured user voice information UVI is stored in the secure memory 231a, the voice trigger system 201a may be capable of operating independently of the host processor 101a.

Figure 6:
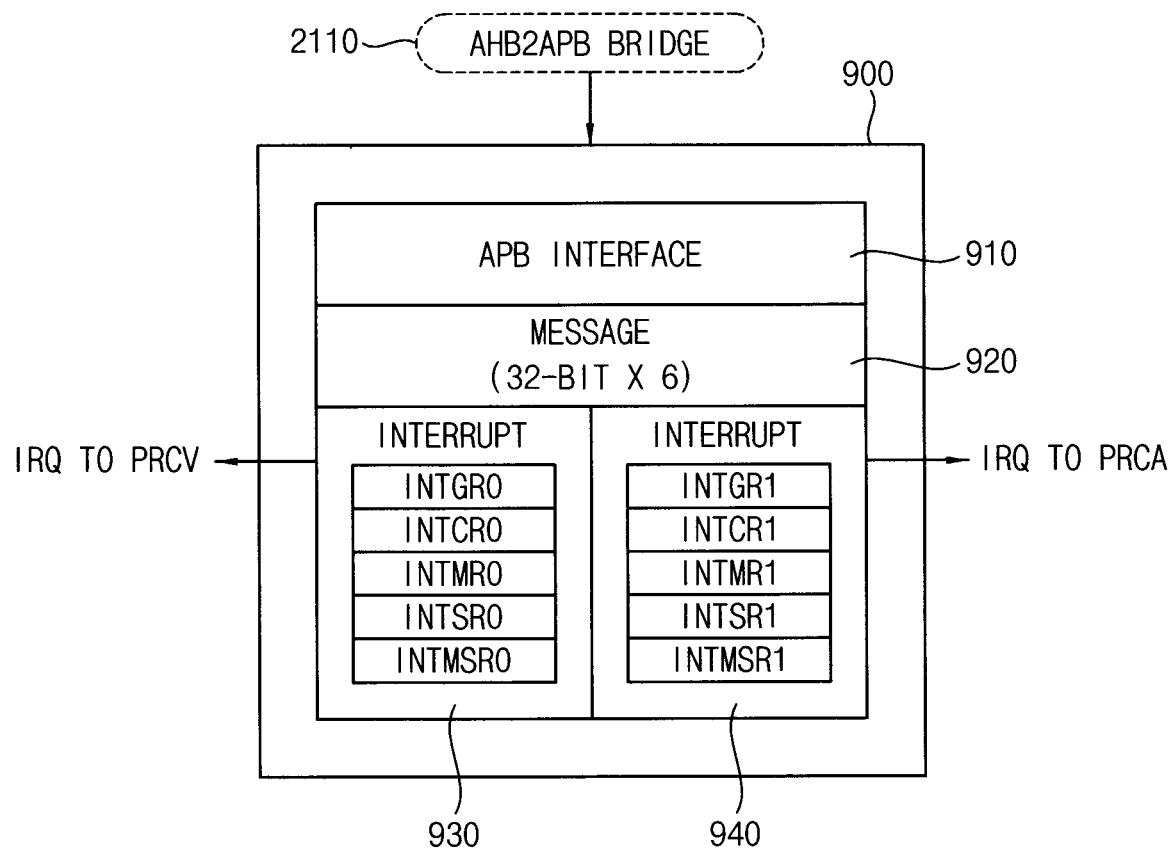
FIG. 6 is a diagram illustrating an example embodiment of a mail box module included in the application processor of FIG. 4.

FIG. 6 is a diagram illustrating an example embodiment of a mail box module included in the application processor of FIG. 4. The mail box module is identified as mail box module SMBX in FIG. 4 and as mail box module 900 in FIG. 6.

Referring to FIGS. 4 and 6, the mail box module SMBX included in the application processor 2001 may support a synchronization of a data transmission or a data communication between the voice trigger system 201 and the audio subsystem 301. The application processor 2001 may perform the data communication between the voice trigger system 201 and the audio subsystem 301 through the mail box module SMBX independently of the system bus 2100. For example, data communications between the voice trigger system 201 and the audio subsystem 301 may be performed via at least one of the mail box module SMBX without using the system bus 2100.

In some example embodiments, security properties (e.g., security properties of the application processor 2001, the voice trigger system 201, and/or the mail box module SMBX) may be set such that the audio subsystem 301 operating in the non-secure state is accessible to the secured voice trigger system 201 through the mail box module SMBX. For example, as illustrated in FIG. 4, the mail box module SMBX may be secured, and the security properties may be set by the interrupt controller 810 and/or the protection controller 820.

As illustrated in FIG. 6, a mail box module 900 may include an interface 910, a message box 920, a first register circuit 930 including a plurality of registers INTGR0, INTCR0, INTMR0, INTSR0 and INTMSR0, and a second register circuit 940 including a plurality of registers INTGR1, INTCR1, INTMR1, INTSR1 and INTMSR1. FIG. 6 illustrates a non-limiting example in which the mail box module 900 is connected to an AHB2APB bridge of the system bus 2100 through an APB interface and the message box 920 is implemented with shared registers of 6*32 bits. The type of the interface 910, the number of registers, and the bit number of the registers in the message box 920 may be determined variously. The first register circuit 930 may generate an interrupt signal (IRQ TO PRCV) provided to the trigger processor 241 in the voice trigger system 201 and the second register circuit 940 may generate an interrupt signal (IRQ TO PRCA) provided to the audio processor 341 in the audio subsystem 301. The data transmission between the voice trigger system 201 and the audio subsystem 301 may be synchronized using the mail box module 900.

The mail box module 900 may perform a bilateral communication by transmitting an interrupt signal after one of the trigger processor 241 and the audio processor 341 writes a message in the message box 920. For example, the mail box module 900 may transmit an interrupt signal based on the message written to the message box 920 by either of the trigger processor 241 or the audio processor 341. The synchronization of the data transmission between the voice trigger system 201 and the audio subsystem 301 may be implemented through a polling method, etc.

Figure 7:
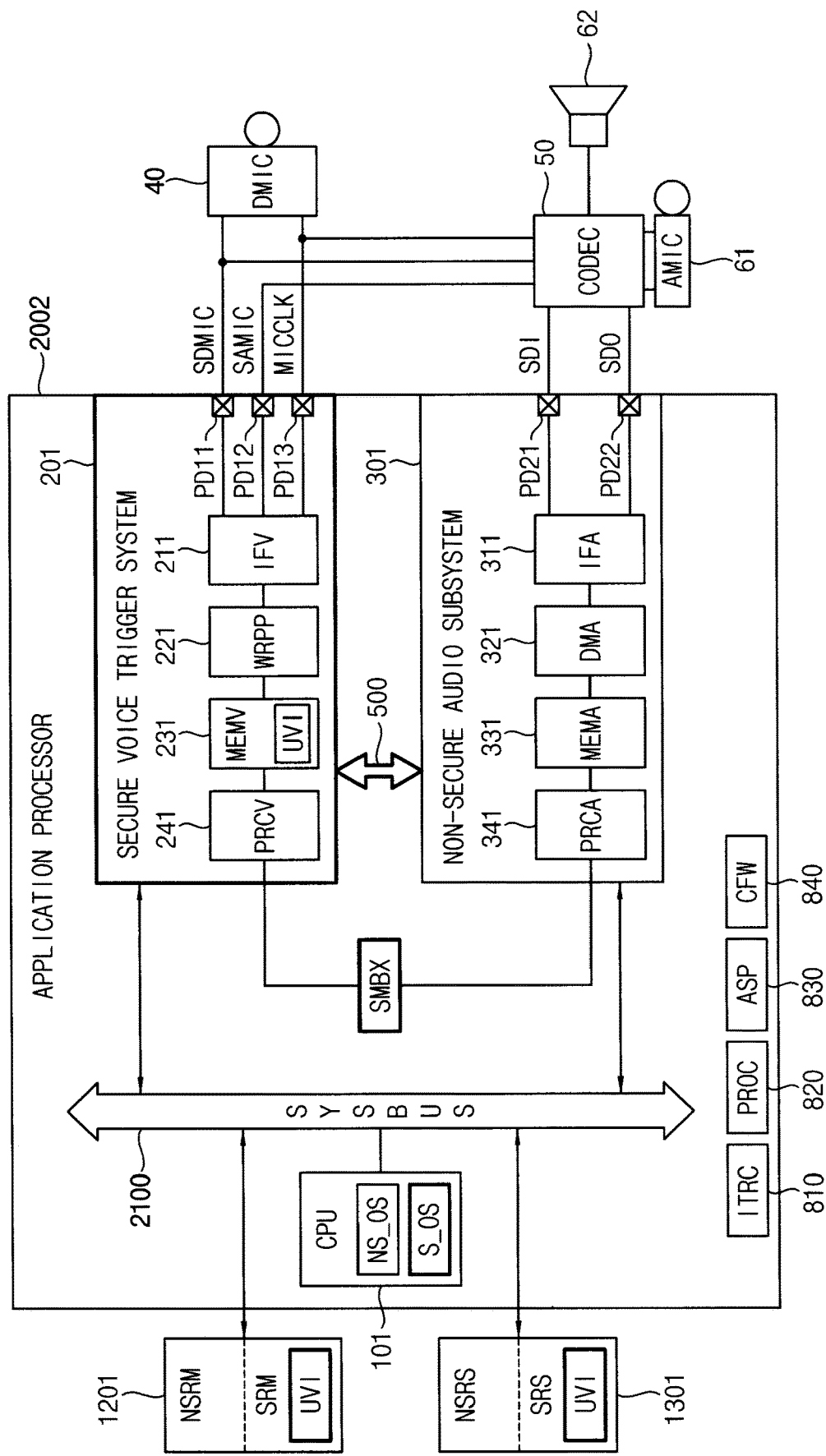
FIG. 7 is a block diagram illustrating an example connection of a voice trigger system and an audio subsystem in an application processor according to example embodiments.

FIG. 7 is a block diagram illustrating an example connection of a voice trigger system and an audio subsystem in an application processor according to example embodiments. The descriptions repeated with FIGS. 3 and 4 may be omitted.

Referring to FIG. 7, an application processor 2002 may include a system bus 2100, a host processor 101, a voice trigger system 201, an audio subsystem 301, and a mail box module SMBX. The application processor 2002 may further include an interrupt controller 810, a protection controller 820, an address space protector 830, a contents firewall 840, and a direct bus 500.

The application processor 2002 of FIG. 7 may be substantially the same as the application processor 2001 of FIG. 4, except that the application processor 2002 further includes the direct bus 500.

The direct bus 500 may electrically connect the voice trigger system 201 and the audio subsystem 301. The direct bus 500 may provide a direct path (e.g., a direct data communication path) between the voice trigger system 201 and the audio subsystem 301, enabling communication signals to be transmitted between the voice trigger system 201 and the audio subsystem 301.

In some example embodiments, security properties (e.g., security properties of the application processor 2002, the voice trigger system 201, the mail box module SMBX, and/or the direct bus 500) may be set such that the audio subsystem 301 operating in the non-secure state is accessible to the secured voice trigger system 201 through the direct bus 500. For example, as illustrated in FIG. 7, the mail box module SMBX and the direct bus 500 may be secured, and the security properties may be set by the interrupt controller 810 and/or the protection controller 820. The application processor 2002 may perform the data communication between the voice trigger system 201 and the audio subsystem 301 through the mail box module SMBX and the direct bus 500 independently of the system bus 2100. For example, data communications between the voice trigger system 201 and the audio subsystem 301 may be performed via at least one of the mail box module SMBX and the direct bus 500 without using the system bus 2100.

Although not illustrated, the audio codec 50 may be included in the audio subsystem 301, or the audio subsystem 301 may be further connected to the Bluetooth module 70 connected to the Bluetooth microphone BMIC 81 and the Bluetooth speaker 82 or the USB module connected to a USB microphone and a USB speaker, or the audio codec 50 may be replaced with the Bluetooth module 70 and/or the USB module, according to example embodiments.

Figure 8:
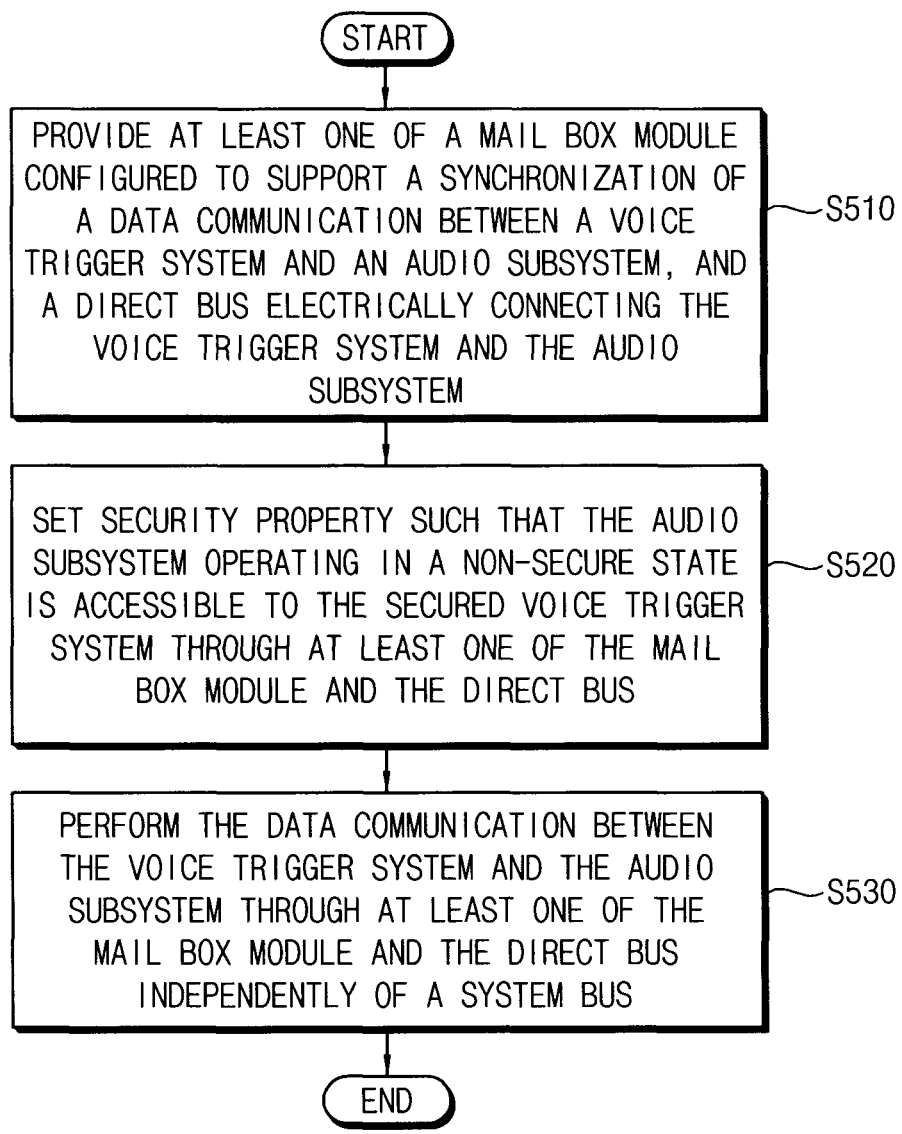
FIG. 8 is a flow chart illustrating a method of operating an application processor according to example embodiments.

FIG. 8 is a flow chart illustrating a method of operating an application processor according to example embodiments.

Referring to FIGS. 4, 7 and 8, at least one of the mail box module SMBX supporting the synchronization of the data communication between the voice trigger system 201 and the audio subsystem 301, and the direct bus 500 electrically connecting the voice trigger system 201 and the audio subsystem 301 may be provided (step S510).

The security property may be set such that the audio subsystem 301 operating in the non-secure state is accessible to the secured voice trigger system 201 through at least one of the mail box module SMBX and the direct bus 500 (step S520).

The data communication between the voice trigger system 201 and the audio subsystem 301 may be performed through at least one of the mail box module SMBX and the direct bus 500 independently of the system bus 2100 (step S530). For example, data communications between the voice trigger system 201 and the audio subsystem 301 may be performed via at least one of the mail box module SMBX and the direct bus 500 without using the system bus 2100.

Figure 9:
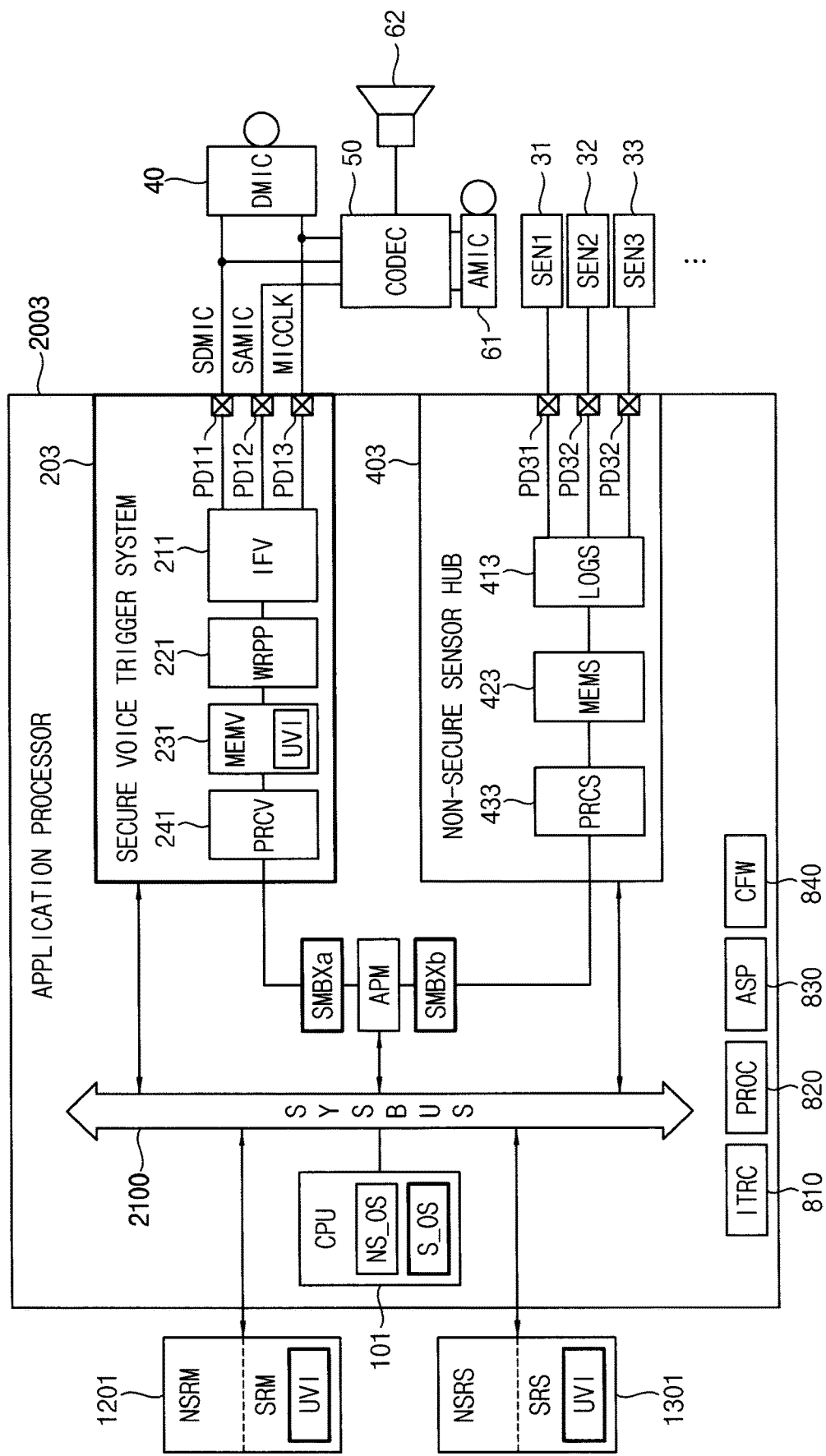
FIGS. 9 and 10 are block diagrams illustrating an example connection of a voice trigger system and a sensor hub in an application processor according to example embodiments.
Figure 10:
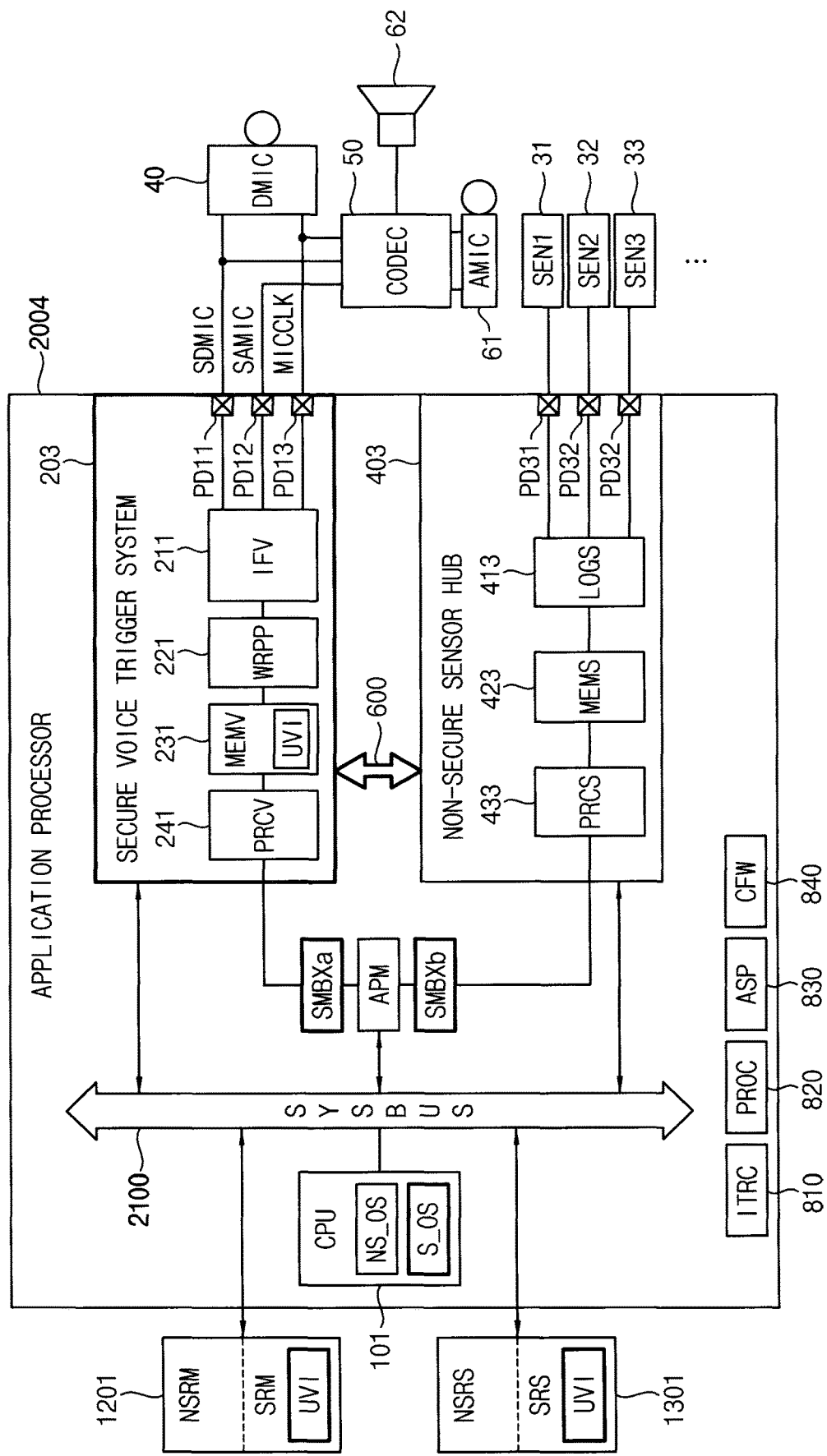

FIGS. 9 and 10 are block diagrams illustrating an example connection of a voice trigger system and a sensor hub in an application processor according to example embodiments. The descriptions repeated with FIGS. 3 and 4 may be omitted.

Referring to FIG. 9, an application processor 2003 may include a system bus 2100, a host processor 101, a voice trigger system 203, a sensor hub 403, an active power manager APM, and mail box modules SMBXa and SMBXb. The sensor hub 403 may be included in the audio processing system 250 in FIG. 2A. The application processor 2003 may further include an interrupt controller 810, a protection controller 820, an address space protector 830, and a contents firewall 840.

The voice trigger system 203 is electrically connected to the system bus 2100. The voice trigger system 203 performs a voice trigger operation based on trigger input signals SDMIC and SAMIC that are provided through a trigger interface TIF. The voice trigger system 203 may receive the trigger input signal SDMIC from a digital microphone DMIC 40 and/or the trigger input signal SAMIC from an audio codec (coder and decoder) CODEC 50. A microphone clock signal MICCLK may be transferred between the voice trigger system 203, the digital microphone 40, and the audio codec 50 for synchronization of a signal transfer. The trigger input signals SDMIC and SAMIC and the microphone clock signal MICCLK may be transferred through pads PD11, PD12, and PD13. The pads PD11, PD12, and PD13 may be implemented such that the used pad may be prevented from being interfered with the other unused pads. For example, the pads PD11, PD12, and PD13 may be electrically isolated from one another, thereby preventing signal interference between the pads PD11, PD12, and PD13.

The voice trigger system 203 is secured independently of the host processor 101. The voice trigger system 203 performs the voice trigger operation based on the trigger input signals SDMIC and SAMIC and the secured user voice information UVI. The trigger input signals SDMIC and SAMIC may be provided through the trigger interface TIF. The secured user voice information UVI may be stored in the trigger memory 231 corresponding to a security region in the secured voice trigger system 203 during the sleep mode. The voice trigger system 203 may perform the training operation to obtain the secured user voice information UVI while the host processor 101 executes the secure operating system S_OS during the active mode.

The sensor hub 403 is electrically connected to the system bus 2100 to process signals provided from one or more sensors SEN1 31, SEN2 32, and SEN3 33. Signals may be transferred from the one or more sensors SEN1 31, SEN2 32, and SEN3 33 through pads PD31, PD32, and PD33. The pads PD31, PD32, and PD33 may be implemented such that each pad does not experience interference from the other pads. For example, the pads PD31, PD32, and PD33 may be electrically isolated from one another, thereby preventing signal interference between the pads PD31, PD32, and PD33.

Unlike the voice trigger system 203, the sensor hub 403 may operate in a non-secure state or a normal state.

The sensor hub 403 may include a sensor logic LOGS 413, a sensor memory MEMS 423, and a sensor processor PRCS 433 to process the signals provided from the various sensors as described with reference to FIG. 3.

The mail box modules SMBXa and SMBXb included in the application processor 2003 may support synchronization of a data transmission or a data communication between the voice trigger system 203 and the sensor hub 403. The application processor 2003 may perform the data communication between the voice trigger system 203 and the sensor hub 403 through the mail box modules SMBXa and SMBXb independently of the system bus 2100. For example, data communication between the voice trigger system 203 and the sensor hub 403 may be performed via the mail box modules SMBXa and SMBXb.

In some example embodiments, security properties may be set such that the sensor hub 403 operating in the non-secure state is accessible to the secured voice trigger system 202 through the mail box modules SMBXa and SMBXb. For example, as illustrated in FIG. 9, the mail box modules SMBXa and SMBXb may be secured, and the security properties of the mail box modules SMBXa and SMBXb may be set by the interrupt controller 810 and/or the protection controller 820.

Referring to FIG. 10, an application processor 2004 may include a system bus 2100, a host processor 101, a voice trigger system 203, a sensor hub 403, an active power manager APM, and mail box modules SMBXa and SMBXb. The application processor 2004 may further include an interrupt controller 810, a protection controller 820, an address space protector 830, a contents firewall 840, and a direct bus 600.

The application processor 2004 of FIG. 10 may be substantially the same as the application processor 2003 of FIG. 9, except that the application processor 2004 further includes the direct bus 600.

The direct bus 600 may electrically connect the voice trigger system 203 and the sensor hub 403. The direct bus 600 may provide a direct path (e.g., a direct data communication path) between the voice trigger system 203 and the sensor hub 403, enabling communication signals to be transmitted between the voice trigger system 203 and the sensor hub 403.

In some example embodiments, security properties may be set such that the sensor hub 403 operating in the non-secure state is accessible to the secured voice trigger system 203 through the direct bus 600. For example, as illustrated in FIG. 10, the mail box modules SMBXa and SMBXb and the direct bus 600 may be secured, and the security properties of the mail box modules SMBXa and SMBXb and the direct bus 600 may be set by the interrupt controller 810 and/or the protection controller 820. The application processor 2004 may perform the data communication between the voice trigger system 204 and the sensor hub 403 through the mail box modules SMBXa and SMBXb and the direct bus 600 independently of the system bus 2100. For example, data communications between the voice trigger system 204 and the sensor hub 403 may be performed via at least one of the mail box modules SMBXa and SMBXb and the direct bus 600 without using the system bus 2100.

In some example embodiments, as illustrated in FIG. 9, two mail box modules SMBXa and SMBXb may perform the synchronization of the data communication between the voice trigger system 203 and the sensor hub 403 via the active power manager APM. The mail box modules SMBXa and SMBXb may be the same as described with reference to FIG. 6. In other example embodiments, one mail box module may perform the synchronization between the voice trigger system 203 and the sensor hub 403 without the active power manager APM.

Figure 11:
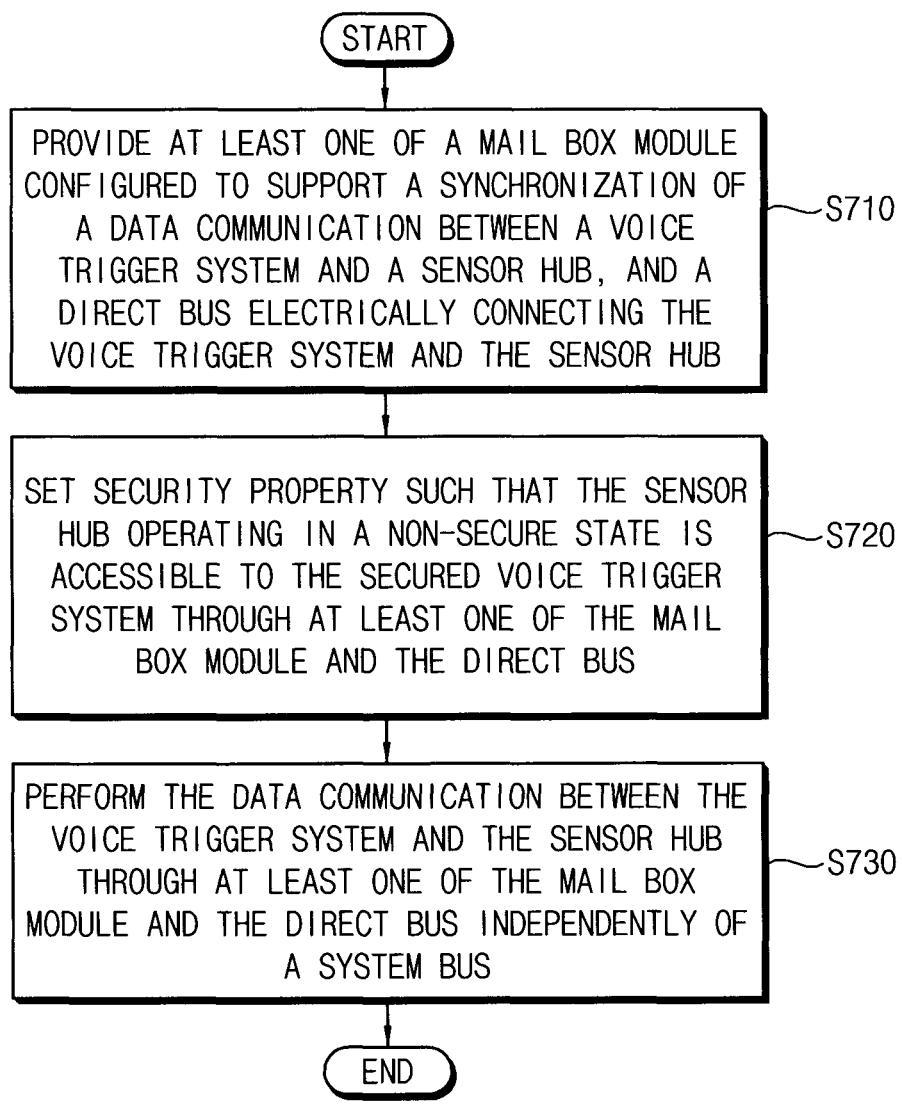
FIG. 11 is a flow chart illustrating a method of operating an application processor according to example embodiments.

FIG. 11 is a flow chart illustrating a method of operating an application processor according to example embodiments.

Referring to FIGS. 9, 10, and 11, at least one of the mail box modules SMBXa and SMBXb supporting the synchronization of the data communication between the voice trigger system 203 and the sensor hub 403, and the direct bus 600 electrically connecting the voice trigger system 203 and the sensor hub 403 may be provided (step S710). For example, at least one mailbox module SMBXa or SMBXb and/or the direct bus 600 may be provided.

The security property may be set such that the sensor hub 403 operating in the non-secure state is accessible to the secured voice trigger system 203 through at least one of the mail box modules SMBXa and SMBXb and the direct bus 600 (step S720). For example, the security property may be set to allow communication between the sensor hub 403 and the secured voice trigger system 203 via at least one of the mail box modules SMBXa and SMBXb and the direct bus 600.

The data communication between the voice trigger system 203 and the sensor hub 403 may be performed through at least one of the mail box modules SMBXa and SMBXb and the direct bus 600 independently of the system bus 2100 (step S730). For example, data communications between the voice trigger system 203 and the sensor hub 403 may be performed via at least one of the mail box modules SMBXa and SMBXb and the direct bus 600 without using the system bus 2100.

Although example embodiments are described with reference to FIGS. 4, 7, 9, and 10 based on examples where the audio subsystem 301 and the sensor hub 403 operate in the non-secure state, the disclosure is not limited thereto. For example, the audio subsystem 301 and the sensor hub 403 may operate in a secure state, e.g., based on a software configuration, and may exchange data with the voice trigger systems 201 and 203 secured based on a hardware configuration independently of the host processor 101.

Figure 12A:
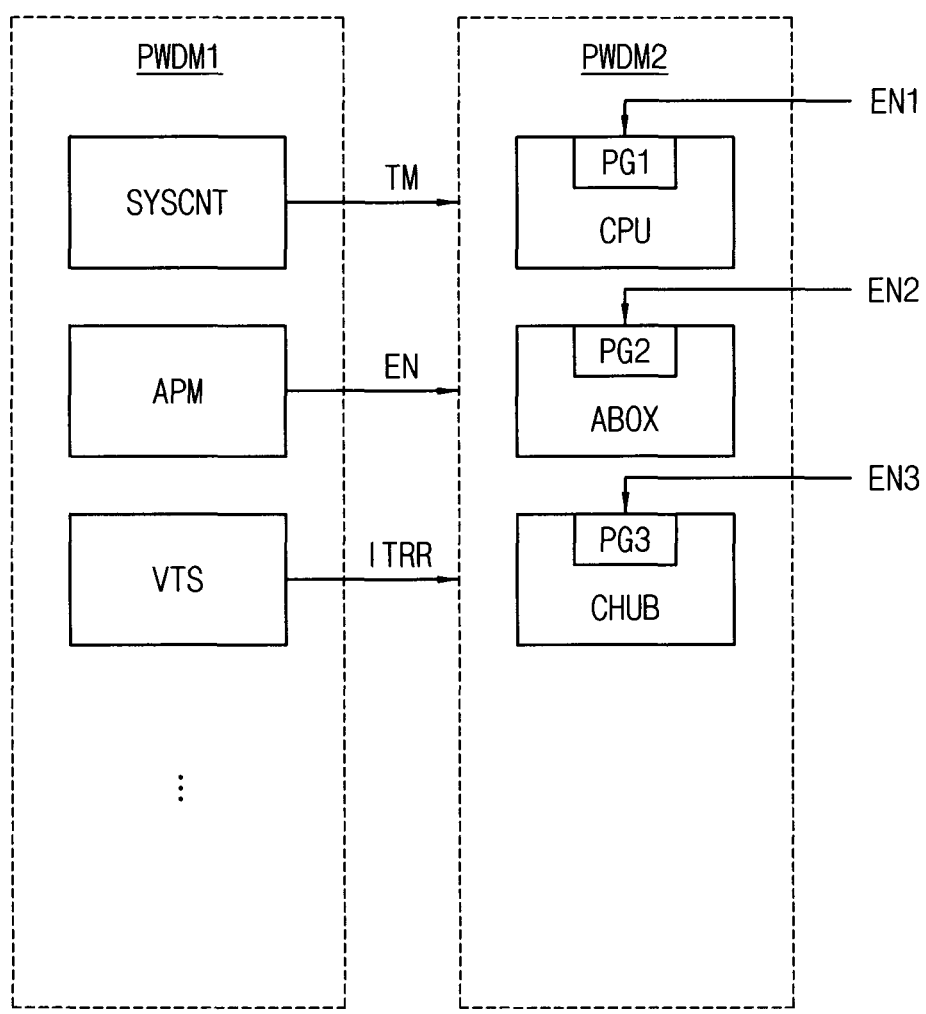
FIGS. 12A and 12B are diagrams for describing power domains of an application processor according to example embodiments.
Figure 12B:
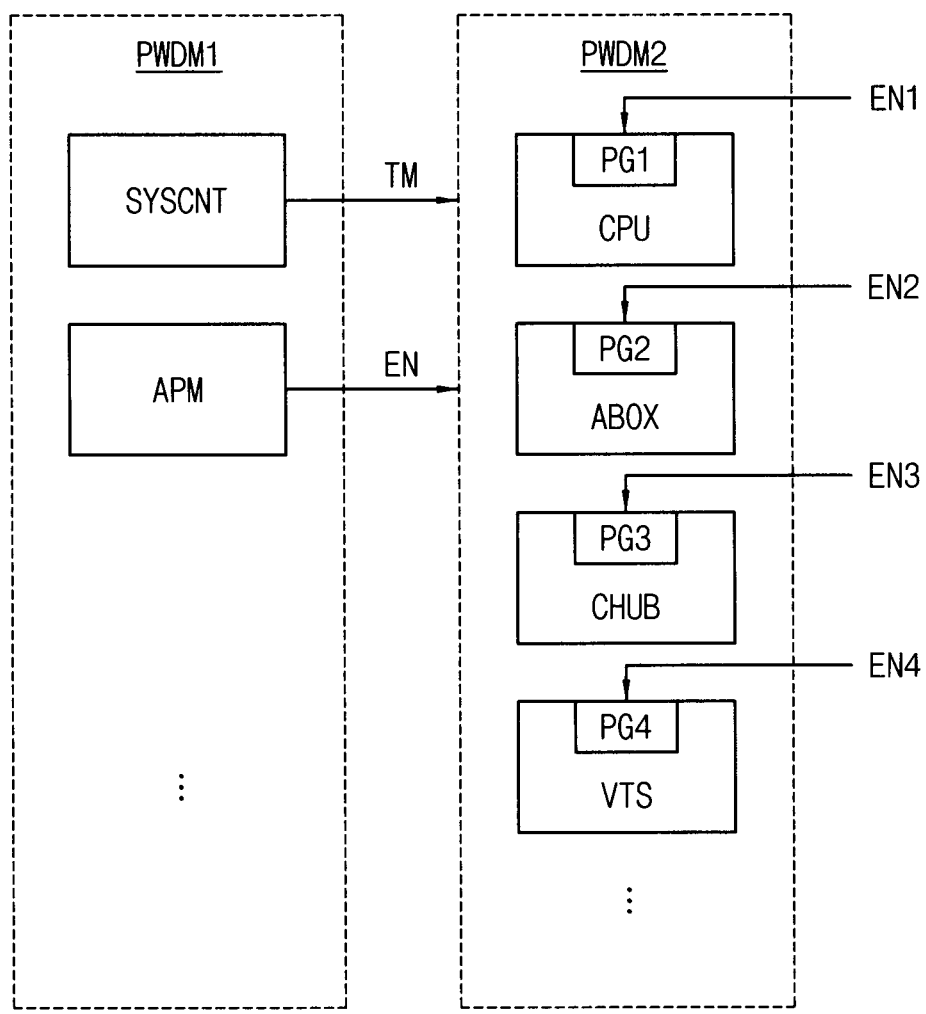

FIGS. 12A and 12B are diagrams for describing power domains of an application processor according to example embodiments.

An application processor may include a plurality of power domains that are independently powered. FIGS. 12A and 12B each illustrate a first power domain PWDM1 and a second power domain PWDM2 as an example. The first power domain PWDM1 corresponds to an always-powered domain where power is supplied in both of an active mode and a standby mode (or a sleep mode), and the second power domain PWDM2 corresponds to a power-save domain where power is blocked in the standby mode.

Referring to FIG. 12A, a system counter SYSCNT, an active power manager APM, and a voice trigger system VTS may be disposed in the always-powered domain PWDM1. A plurality of hardware blocks such as a host processor CPU, an audio subsystem ABOX, a sensor hub CHUB, etc. may be disposed in the power-save domain PWDM2.

The system counter SYSCNT may generate time information TM and provide the time information TM to internal circuits of the system. The active power manager APM may generate a plurality of power enable signals EN to control power supply, power block, etc. of various elements in the system. The voice trigger system VTS may generate an interrupt signal ITRR representing the trigger event.

In this disclosure, the active mode represents that at least the host processor CPU is enabled and an operating system (OS) is running. The sleep mode or the standby mode represents a power-down mode that the host processor CPU is disabled.

In comparison with the disposition of FIG. 12A, in some embodiments, the voice trigger system VTS may be disposed in the power-save domain PWDM2 as illustrated in FIG. 12B.

As illustrated in FIGS. 12A and 12B, the host processor CPU, the voice trigger system VTS, the audio subsystem ABOX, and the sensor hub CHUB may include power gating circuits PG1, PG2, PG3 and PG4, respectively. The power gating circuits PG1~PG4 may supply power selectively in response to power enable signals EN1, EN2, EN3 and EN4, respectively. As such, the voice trigger system VTS, the audio subsystem ABOX, and the sensor hub CHUB may be power-gated and enabled independently of the host processor CPU. In some example embodiments, the voice trigger system VTS may request the active power manager APM so that the sensor hub CHUB may be enabled when it is required.

As described above, the application processor, the electronic device including the application processor, and the method of operating the application processor according to example embodiments may perform the voice trigger operation with low power and high efficiency by integrating the voice trigger system in the application processor. The on-chip voice trigger system may perform some operations instead of a host processor in the application processor to reduce the power consumption and enhance the performance of the electronic device.

In addition, the voice trigger operation and/or the training operation may be performed by the voice trigger system that is secured independently of the host processor. Accordingly, in comparison with a conventional voice trigger system disposed external to an application processor, the application processor including the voice trigger system according to example embodiments may support enhanced security feature and may have improved security performance.

The inventive concepts may be applied to various integrated circuits, electronic devices and electronic systems supporting the voice trigger function. For example, the inventive concepts may be applied to systems such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An application processor comprising:
    a system bus;
    a host processor electrically connected to the system bus; and
    a voice trigger system electrically connected to the system bus, the voice trigger system being configured to perform a voice trigger operation and issue a trigger event based on a trigger input signal that is provided through a trigger interface,
    wherein the voice trigger system is secured independently of the host processor,
    wherein the voice trigger system is configured to perform the voice trigger operation during a sleep mode in which the system bus and the host processor are disabled based on secured user voice information that is stored in a security region in the secured voice trigger system, the secured user voice information including a characteristic of a user voice,
    wherein, in response to the trigger event issued by the voice trigger system, the system bus and the host processor are configured to enter an active mode in which the system bus and the host processor are enabled,
    wherein the trigger event is issued when the trigger input signal includes the secured user voice information,
    wherein the secured voice trigger system and the secured user voice information have a function of tamper-resistance against tampering attacks, and
    wherein the secured user voice information includes a signal-to-noise ratio (SNR) of the user voice that is stored as the characteristic of the user voice.

2. The application processor of claim 1, wherein the voice trigger system is included in a secure element that is integrated in the application processor.

3. The application processor of claim 2, wherein the voice trigger system includes:

a secure trigger memory;
a trigger interface circuit forming the trigger interface to sample and convert the trigger input signal provided from a digital microphone or an audio codec;
a wrapper configured to store data provided from the trigger interface circuit in the secure trigger memory; and
a secure trigger processor configured to perform the voice trigger operation based on the data stored in the secure trigger memory, and
wherein the secured user voice information is stored in the secure trigger memory corresponding to the security region in the secured voice trigger system.

4. The application processor of claim 1,
wherein the host processor is configured to execute one of a secure operating system (OS) and a non-secure operating system during the active mode in which the system bus and the host processor are enabled, and
wherein the secured voice trigger system is configured to perform a training operation to obtain the secured user voice information while the host processor executes the secure operating system.

5. The application processor of claim 4, wherein the secured voice trigger system is configured to store at least one of vocal spectral energy of the user voice, frequency bandwidth of the user voice, reverberation time (RT) while the user voice is being input, and the signal-to-noise ratio (SNR) of the user voice is stored as the characteristic of the user voice when performing the training operation.

6. The application processor of claim 1, further comprising:
an audio subsystem electrically connected to the system bus, the audio subsystem being configured to process audio streams that are replayed or recorded through an audio interface,
wherein the audio subsystem operates in a non-secure state.

7. The application processor of claim 6, further comprising:
a mail box module configured to support a synchronization of a data communication between the voice trigger system and the audio subsystem,
wherein a security property is set such that the audio subsystem operating in the non-secure state is accessible to the secured voice trigger system through the mail box module.

8. The application processor of claim 7, further comprising:
a direct bus electrically connecting the voice trigger system and the audio subsystem,
wherein the security property is set such that the audio subsystem operating in the non-secure state is accessible to the secured voice trigger system through the direct bus.

9. The application processor of claim 8, wherein the data communication between the voice trigger system and the audio subsystem is performed through the direct bus and the mail box module independently of the system bus.

10. The application processor of claim 1, further comprising:
a sensor hub electrically connected to the system bus, the sensor hub being configured to process signals provided from at least one sensor,
wherein the sensor hub operates in a non-secure state.

11. The application processor of claim 10, further comprising:
a mail box module configured to support a synchronization of a data communication between the voice trigger system and the sensor hub,
wherein a security property is set such that the sensor hub operating in the non-secure state is accessible to the secured voice trigger system through the mail box module.

12. The application processor of claim 11, further comprising:
a direct bus electrically connecting the voice trigger system and the sensor hub,
wherein the security property is set such that the sensor hub operating in the non-secure state is accessible to the secured voice trigger system through the direct bus.

13. The application processor of claim 1, wherein all of the system bus, the host processor, and the voice trigger system are integrated in a single semiconductor chip.

14. The application processor of claim 1, wherein the voice trigger system is power-gated and enabled independently of the host processor.

15. An electronic device comprising:
an application processor; and
at least one audio input-output device,
the application processor comprising:
a system bus;
a host processor electrically connected to the system bus; and
a voice trigger system electrically connected to the system bus, the voice trigger system being configured to perform a voice trigger operation and to issue a trigger event based on a trigger input signal that is provided through a trigger interface,
wherein the voice trigger system is secured independently of the host processor, and
wherein the voice trigger system is configured to perform the voice trigger operation during a sleep mode in which the system bus and the host processor are disabled based on secured user voice information that is stored in a security region in the secured voice trigger system,
wherein, in response to the trigger event, the system bus and the host processor are configured to enter an active mode in which the system bus and the host processor are enabled,
wherein the voice trigger system is configured to issue the trigger event when the trigger input signal includes the secured user voice information,
wherein the secured voice trigger system and the secured user voice information have a function of tamper-resistance against tampering attacks, and
wherein the secured user voice information includes a signal-to-noise ratio (SNR) of the user voice that is stored as a characteristic of the user voice.

16. The electronic device of claim 15, further comprising:
a memory device divided into a secure memory region and a non-secure memory region; and
a storage device divided into a secure storage region and a non-secure storage region, and
wherein the secured user voice information is stored in the secure memory region or the secure storage region.

17. The electronic device of claim 16, wherein the memory device includes at least one of a dynamic random access memory (DRAM), a static random access memory (SRAM), and a mobile DRAM.

18. The electronic device of claim 16, wherein the storage device includes at least one of a flash memory, a phase change random access memory (PRAM), a resistance random access memory (RRAM), a nano floating gate memory (NFGM), a polymer random access memory (PoRAM), a magnetic random access memory (MRAM) and a ferroelectric random access memory (FRAM).

19. A method of operating an application processor, the method comprising:
- operating a voice trigger system that is secured independently of a host processor, the voice trigger system being integrated with the host processor and a system bus electrically connecting the host processor and the voice trigger system in a single semiconductor chip forming the application processor; and
- performing, by the secured voice trigger system, a voice trigger operation based on a trigger input signal and secured user voice information to issue a trigger event during a sleep mode in which the system bus and the host processor are disabled, the trigger input signal being provided through a trigger interface, the secured user voice information being stored in a security region in the secured voice trigger system,
- wherein, in response to the trigger event, the system bus and the host processor enter an active mode in which the system bus and the host processor are enabled,
- wherein the trigger event is issued when the trigger input signal includes the secured user voice information,
- wherein the secured voice trigger system and the secured user voice information have a function of tamper-resistance against tampering attacks, and
- wherein the secured user voice information includes a signal-to-noise ratio (SNR) of the user voice that is stored as a characteristic of the user voice.

20. The method of claim 19, further comprising:
- performing, by the secured voice trigger system, a training operation to obtain the secured user voice information while the host processor executes a secure operating system (OS) during the active mode in which the system bus and the host processor are enabled.

* * * * *